United States Patent [19]
Imade et al.

[11] Patent Number: 5,872,864
[45] Date of Patent: Feb. 16, 1999

[54] IMAGE PROCESSING APPARATUS FOR PERFORMING ADAPTIVE DATA PROCESSING IN ACCORDANCE WITH KIND OF IMAGE

[75] Inventors: Shinichi Imade, Iruma; Seiji Tatsuta, Tokyo, both of Japan

[73] Assignee: Olympus Optical Co., Ltd., Tokyo, Japan

[21] Appl. No.: 562,637

[22] Filed: Nov. 27, 1995

Related U.S. Application Data

[63] Continuation of Ser. No. 123,533, Sep. 17, 1993, abandoned.

[30] Foreign Application Priority Data

Sep. 25, 1992 [JP] Japan ................................ 4-256853
Jul. 1, 1993 [JP] Japan ................................ 5-163635

[51] Int. Cl.$^6$ ........................................ G06K 9/36
[52] U.S. Cl. ........................................ 382/176; 382/156
[58] Field of Search ........................ 382/173, 176, 382/270, 271, 272

[56] References Cited

U.S. PATENT DOCUMENTS

| | | | |
|---|---|---|---|
| 5,073,953 | 12/1991 | Westdijk ................................ | 382/9 |
| 5,202,933 | 4/1993 | Bloomberg ............................ | 382/9 |
| 5,293,430 | 3/1994 | Shiau et al. .......................... | 382/9 |
| 5,335,290 | 8/1994 | Cullen et al. ........................ | 382/9 |

FOREIGN PATENT DOCUMENTS

| | | |
|---|---|---|
| 60-140471 | 7/1985 | Japan . |
| 61-296481 | 12/1986 | Japan . |
| 4-18350 | 3/1992 | Japan . |

OTHER PUBLICATIONS

IEEE Transactions on Communications; Y. Linde et al; "An Algorithm for Vector Quantizer Design"; Jan. 1980; vol. Com. 28, No. 1; pp. 84–95.

*Primary Examiner*—Joseph Mancuso
*Assistant Examiner*—Larry J. Prikockis
*Attorney, Agent, or Firm*—Frishauf, Holtz, Goodman, Langer & Chick

[57] ABSTRACT

An image processing apparatus includes an image input section, a color image/monochrome image converting section for performing image area division, a binarization circuit for binarizing a converted monochrome image, a reducing section for reducing a binary image, a boundary extracting section for extracting the boundaries between the areas of constituent elements constituting an input image, e.g., a binary image and a continuous gradation image, and a kind-of-image determining section for determining the kinds of images in partial areas defined by the extracted boundaries. For example, the image processing apparatus further includes a data compressing section. In the image processing apparatus, pre-processing is performed to efficiently performing pattern determination in consideration of localization of frequencies of occurrence of edges and black pixel patterns of an image, and kind-of-image determination is performed by a neural network on the basis of the data obtained by pre-processing, thus performing suitable processing such as data compression in accordance with the determination result.

4 Claims, 28 Drawing Sheets

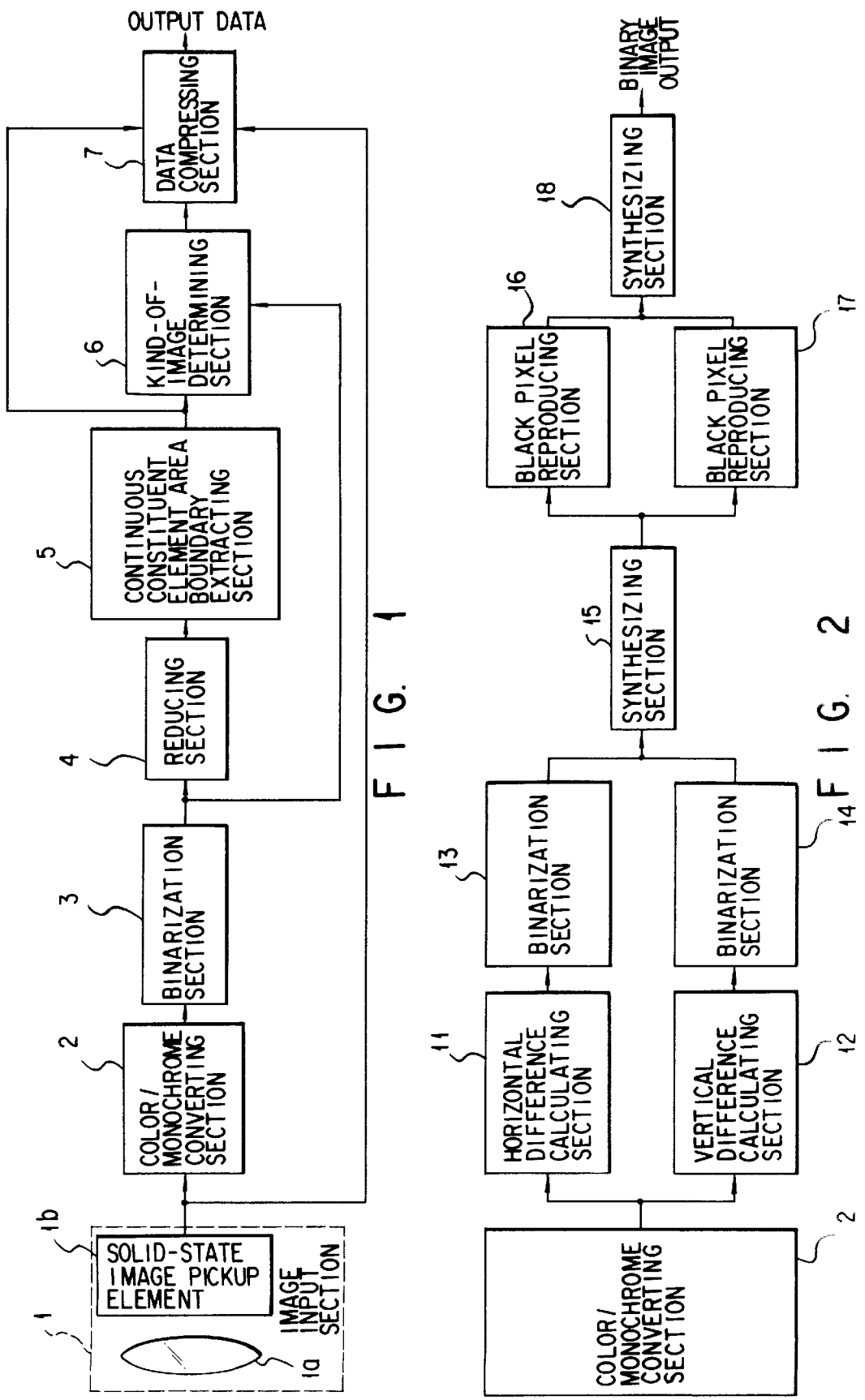

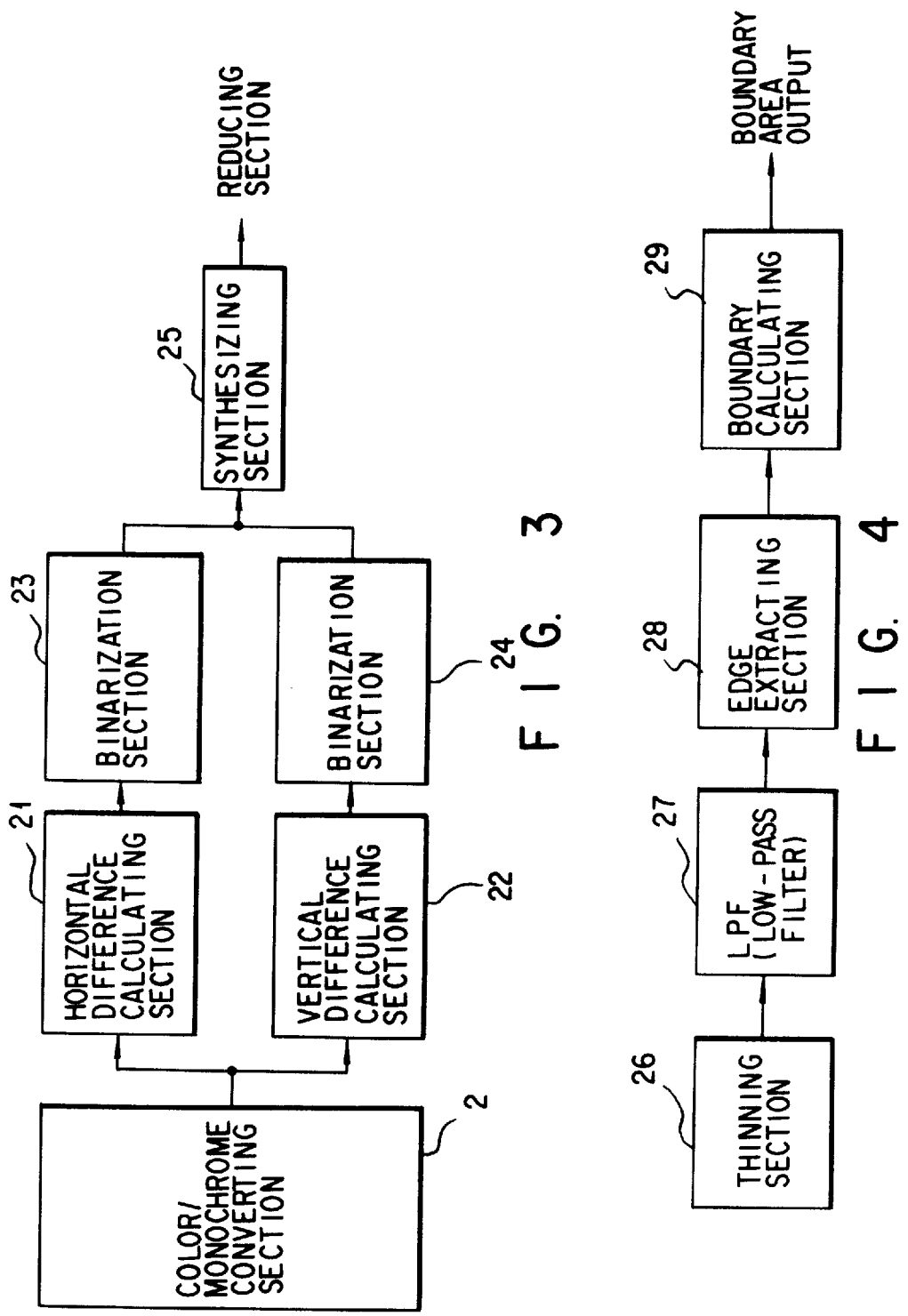

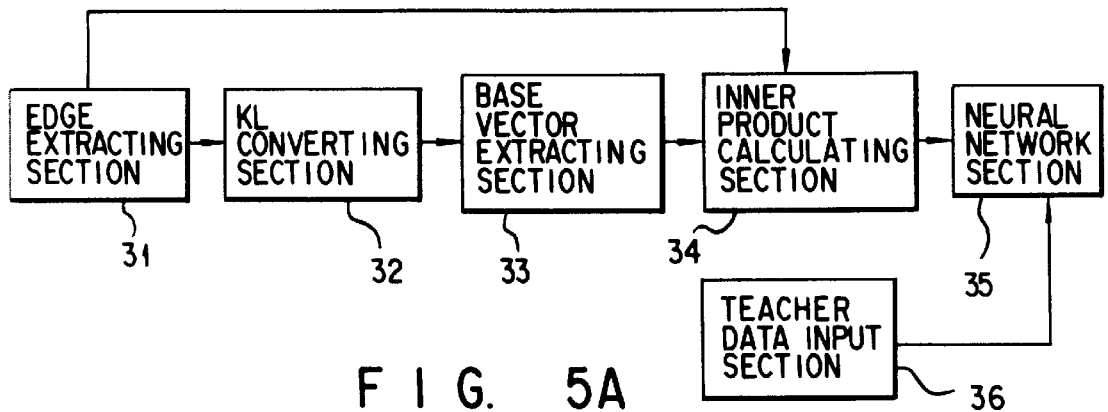
F I G. 5A
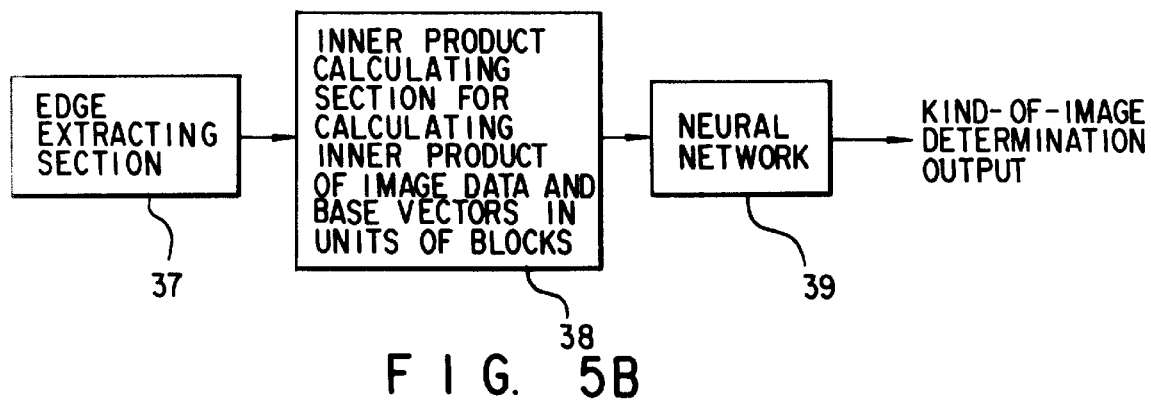
F I G. 5B
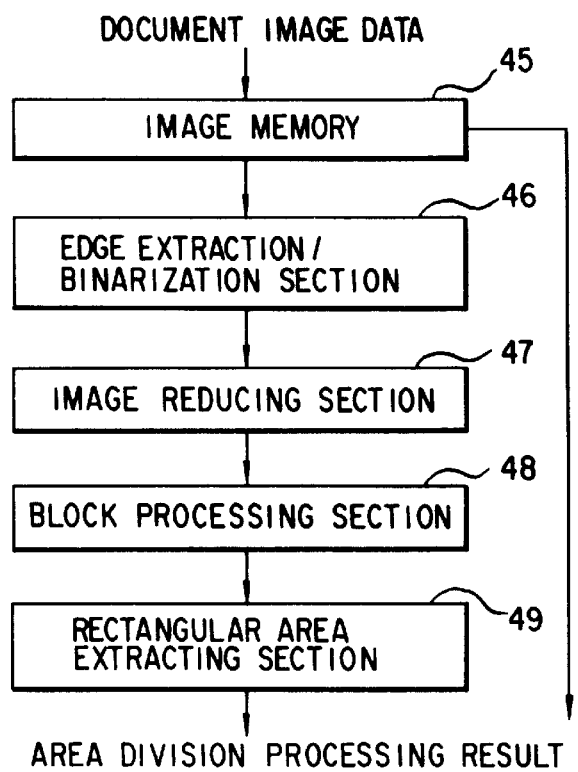
F I G. 6

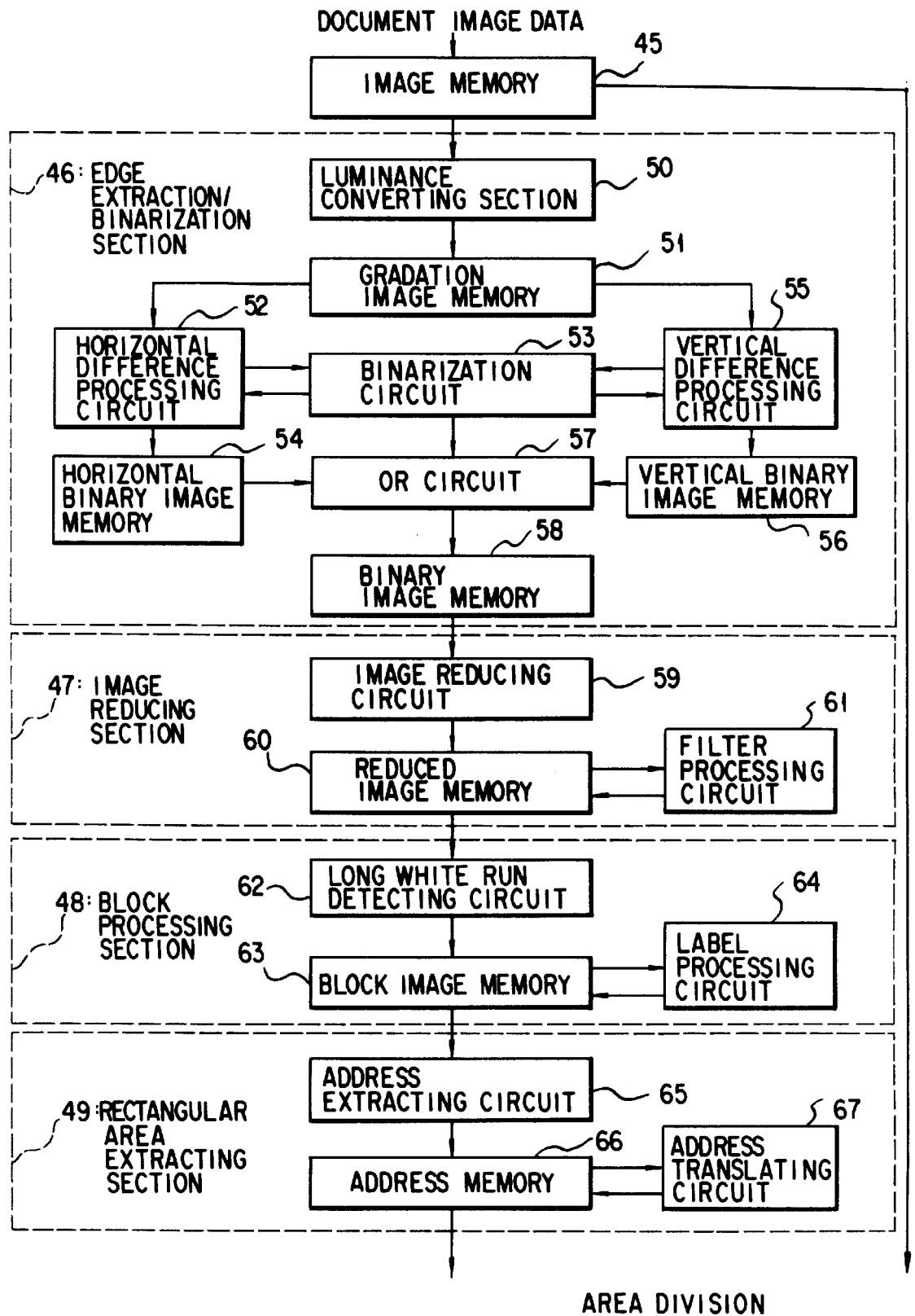
F I G. 7

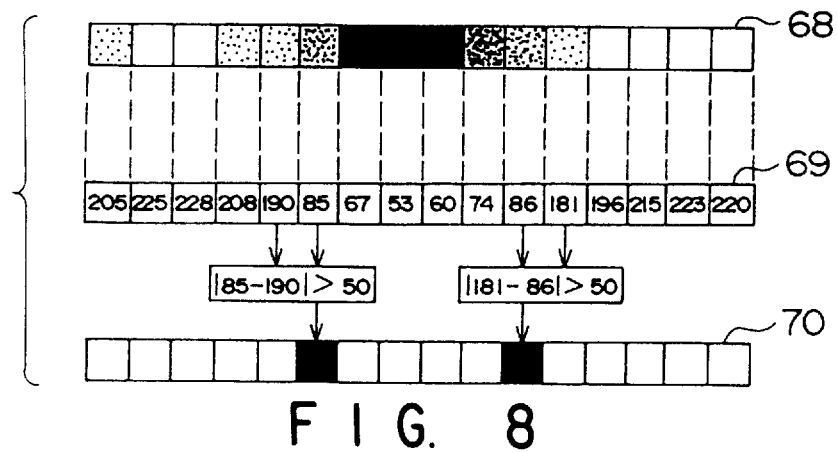
FIG. 8
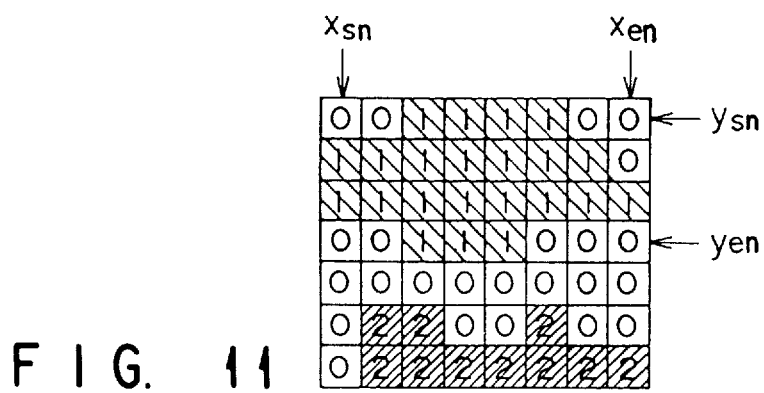
FIG. 9
FIG. 10
FIG. 11

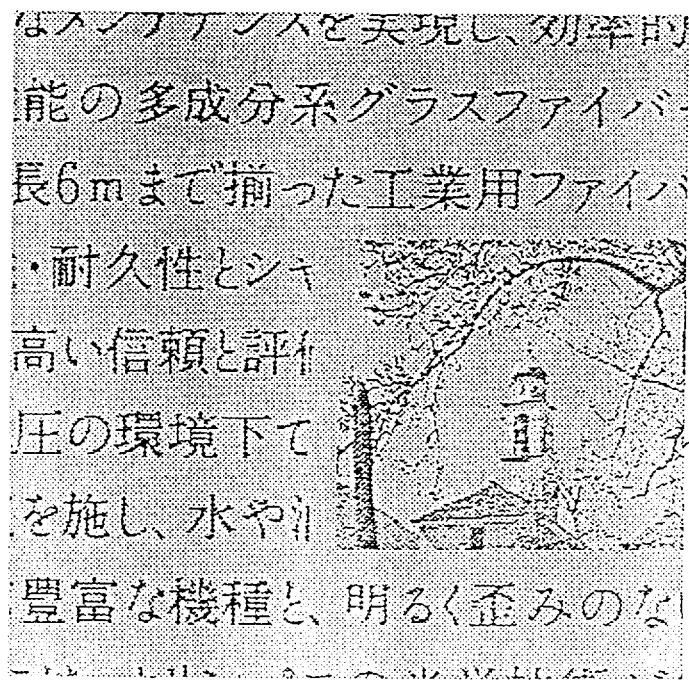
F I G. 12A
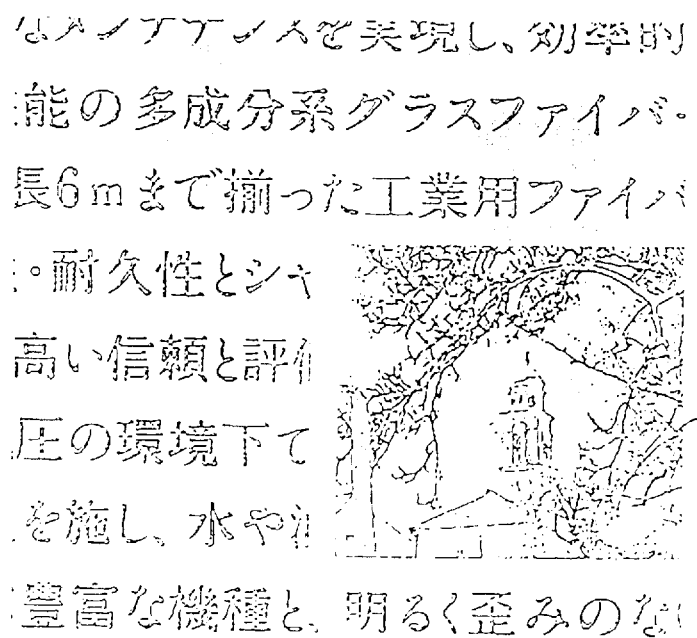
F I G. 12B

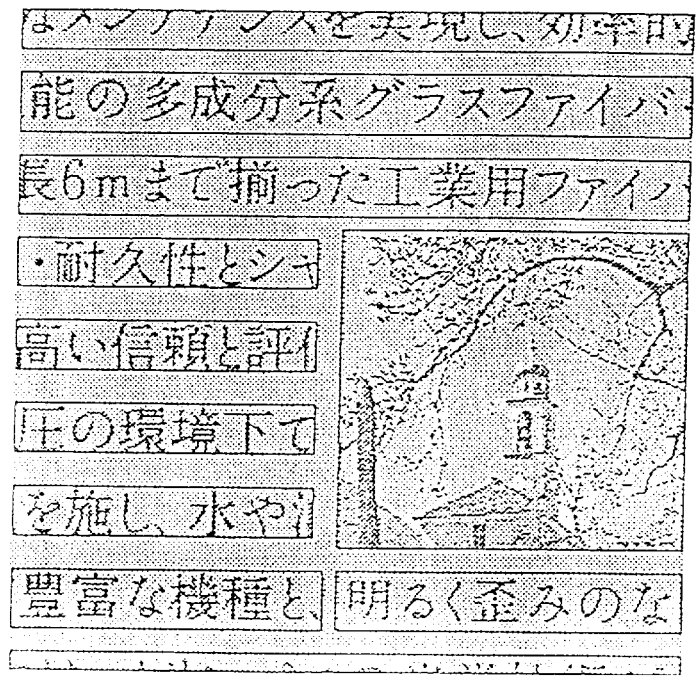
F I G. 14
F I G. 19

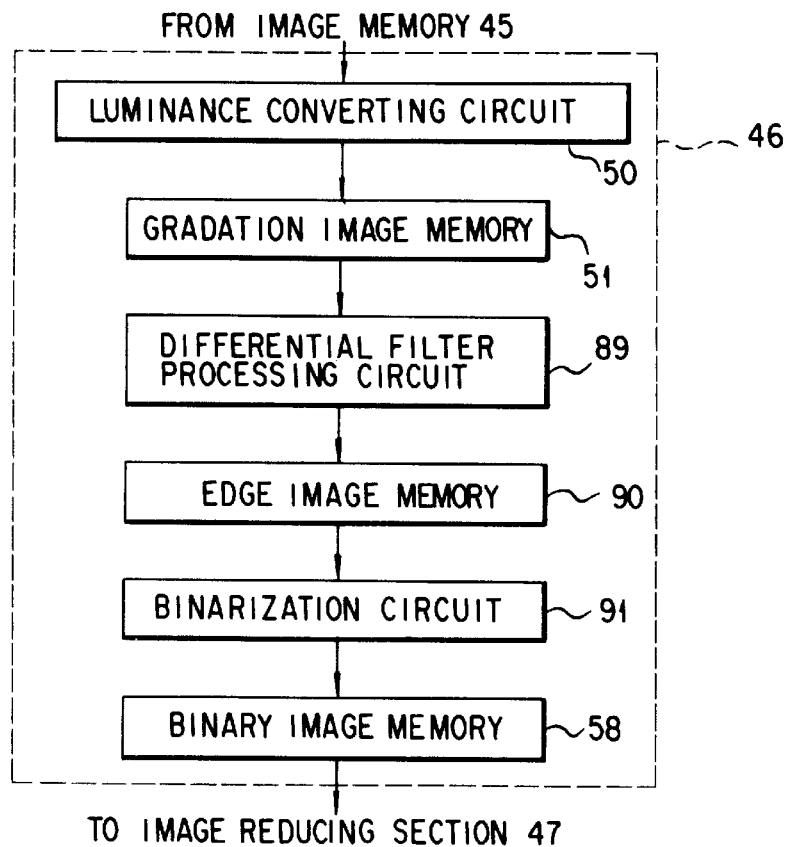
F I G. 22
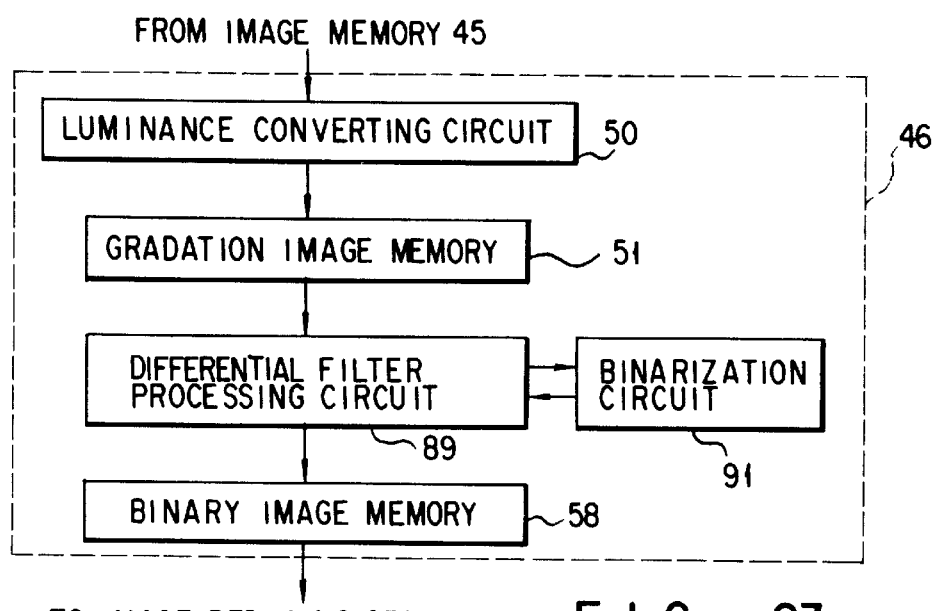
F I G. 23

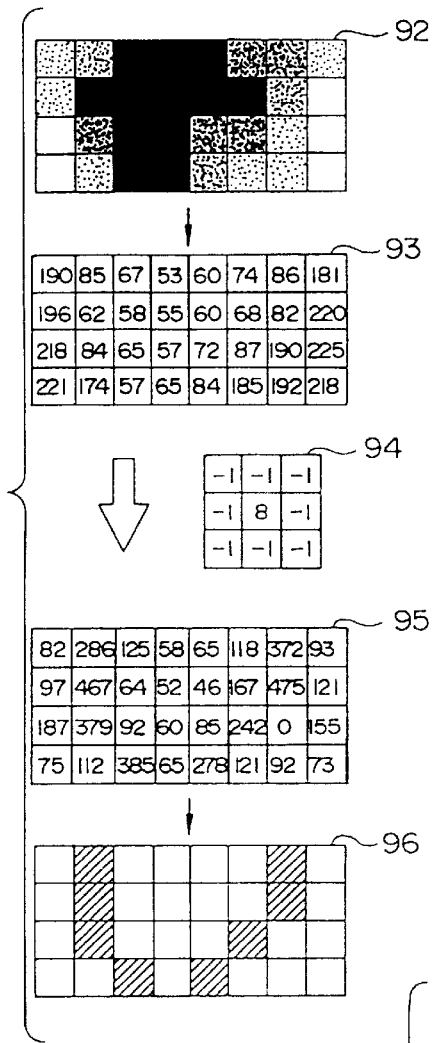
F I G. 24
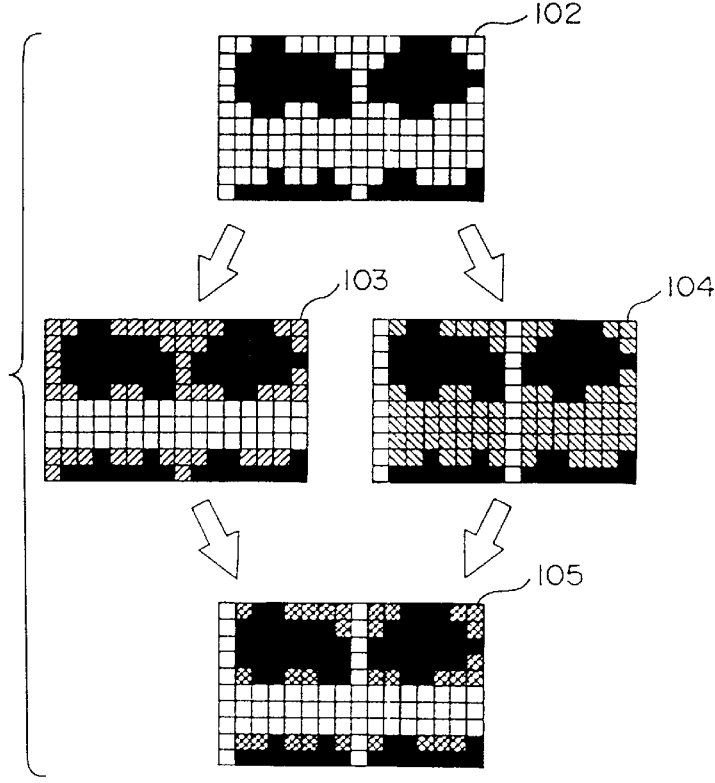
F I G. 26

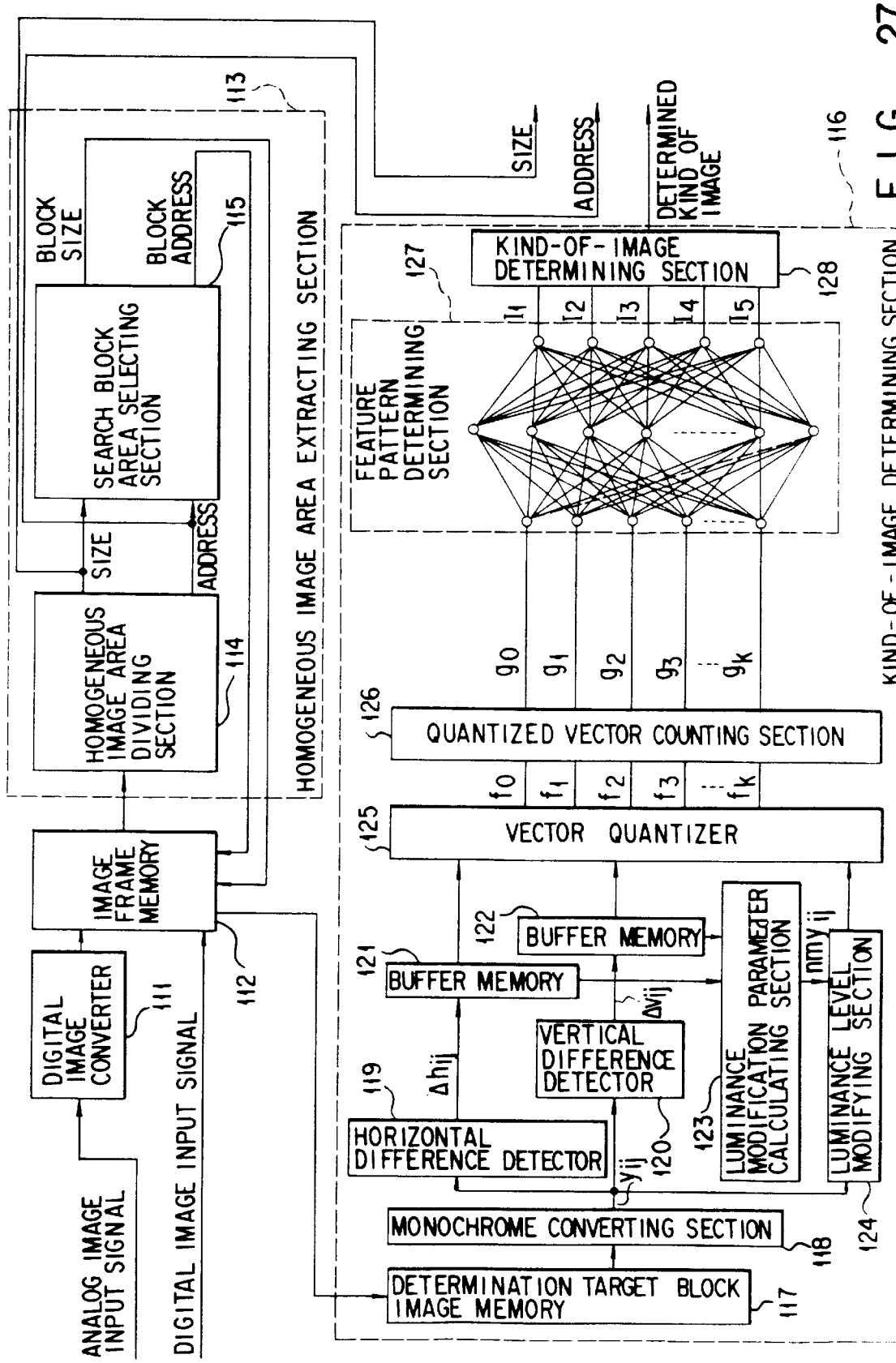

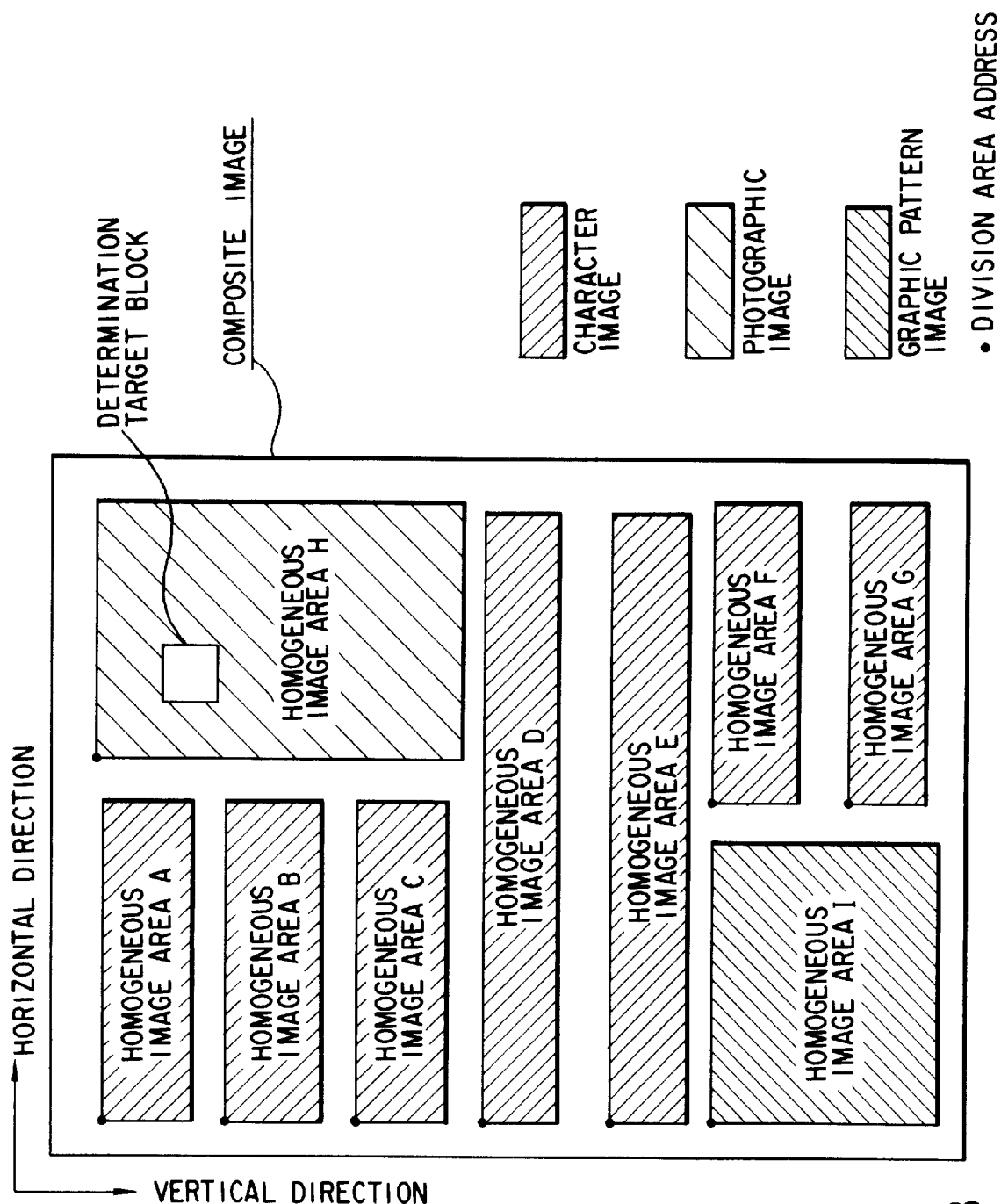
F I G. 28

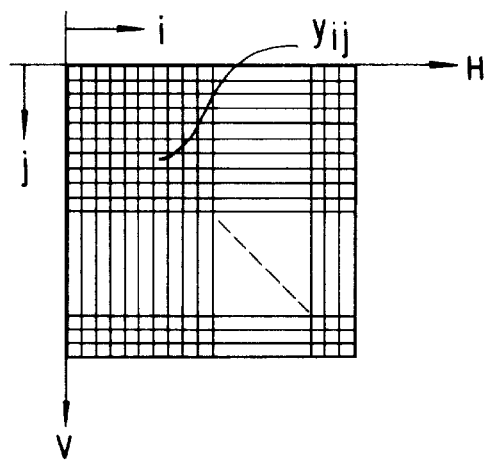
F I G. 29A
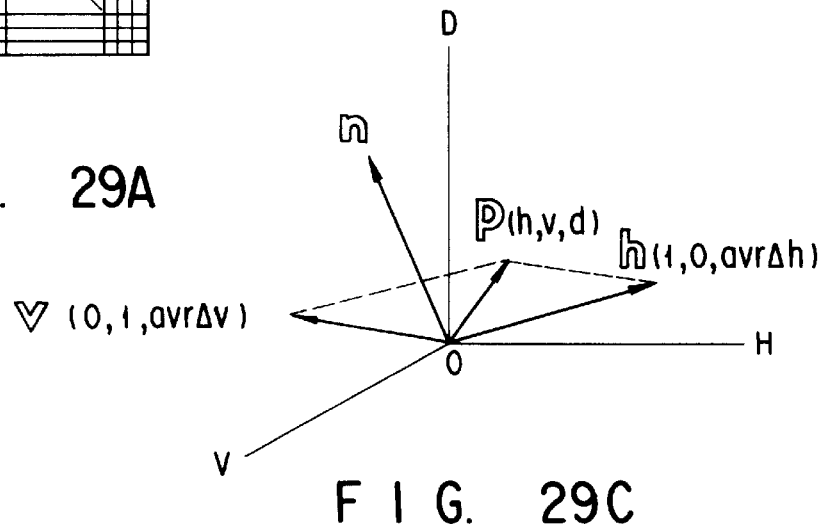
F I G. 29C
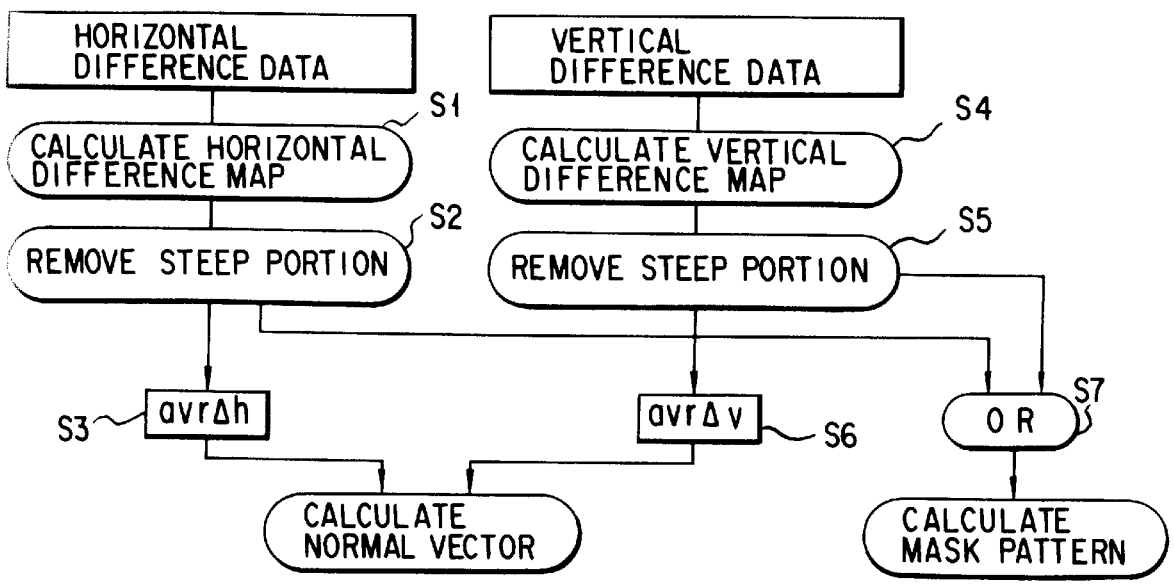
F I G. 29B

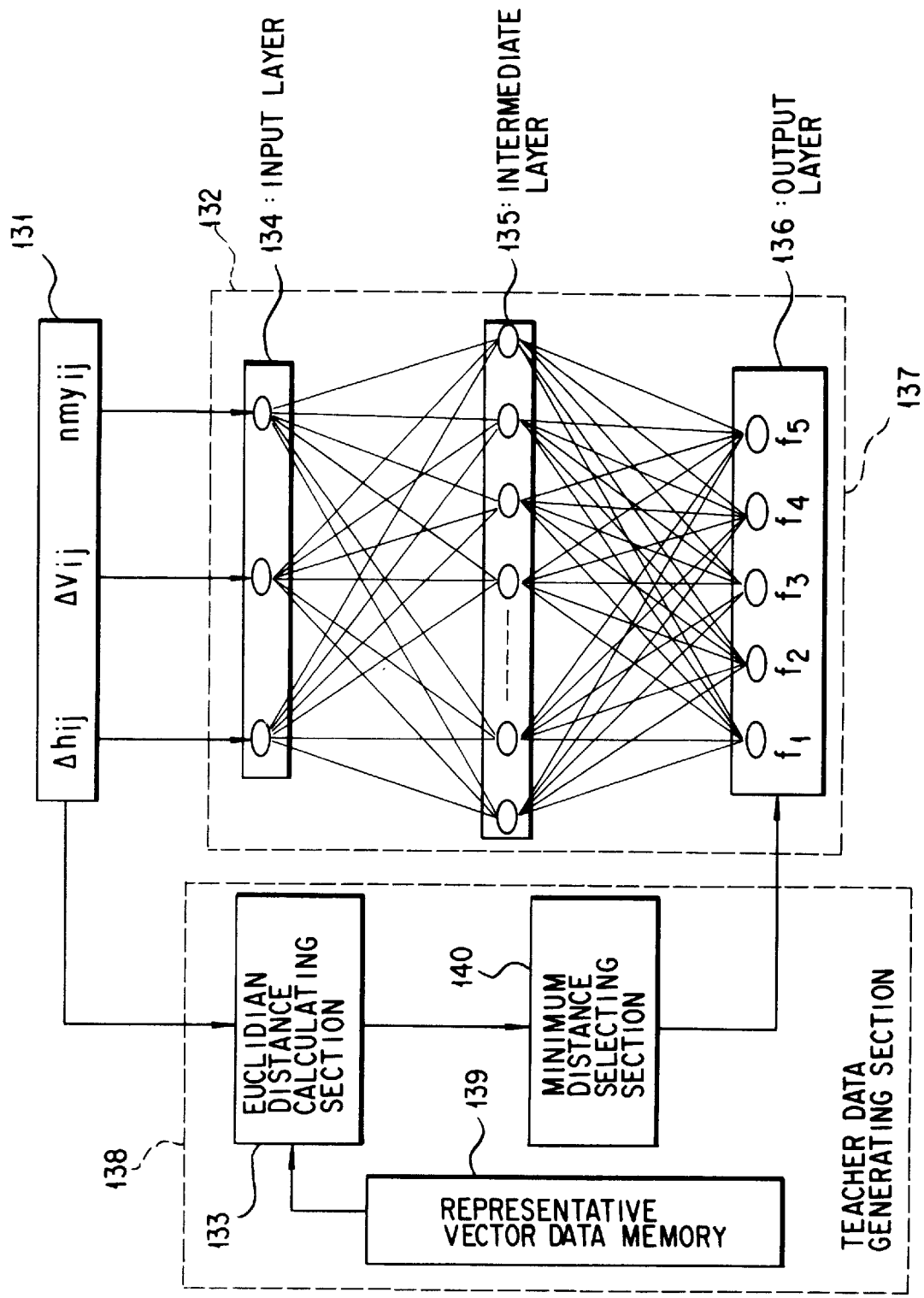
F I G. 32

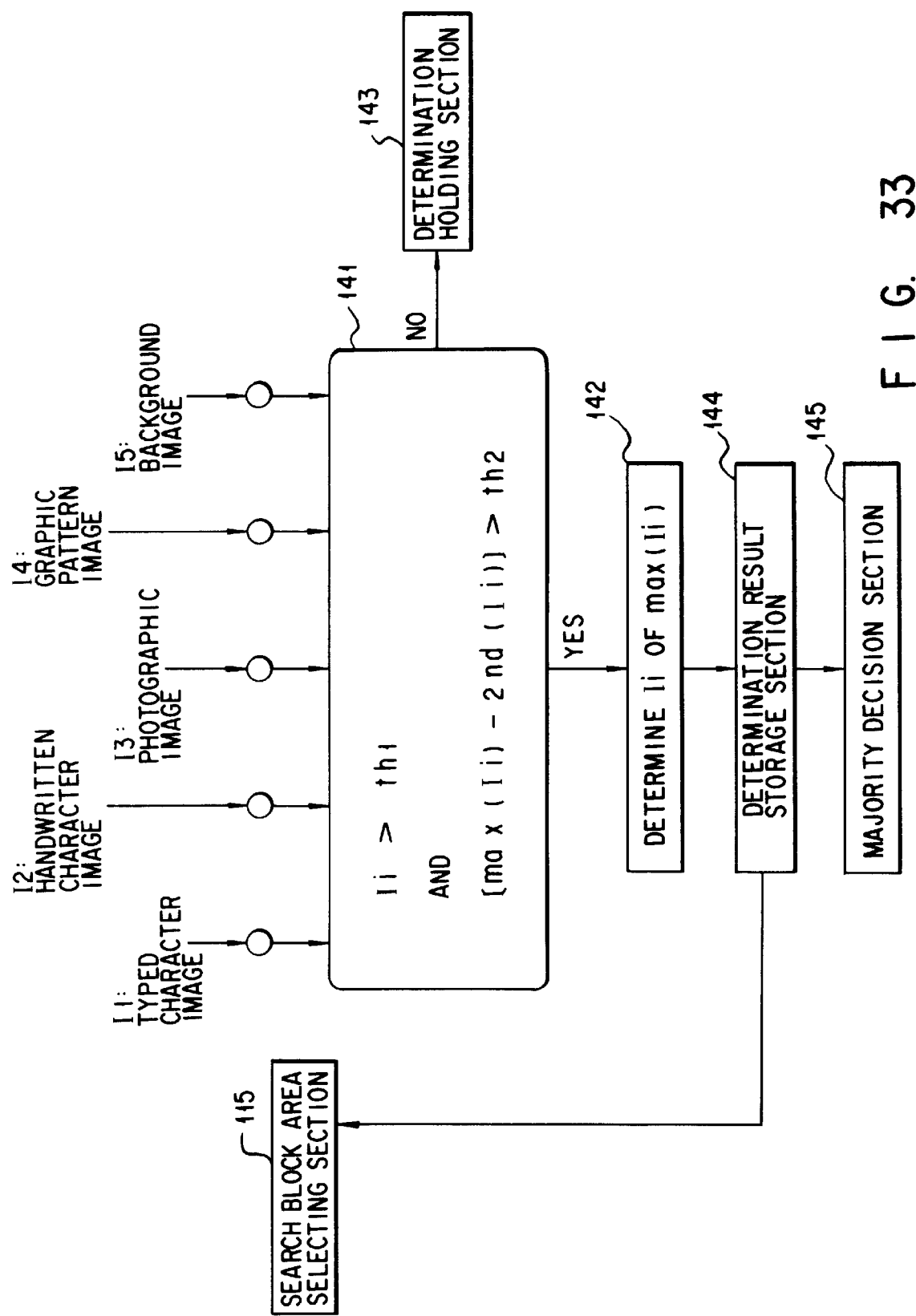
F I G. 33

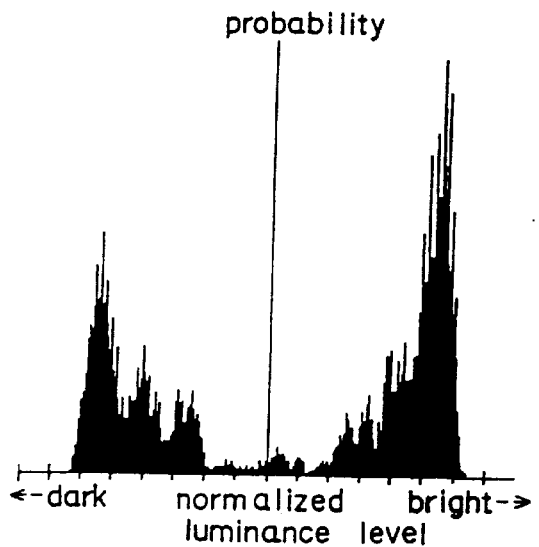
TYPED CHARACTER IMAGE
(Modify Histogram)
F I G. 36A
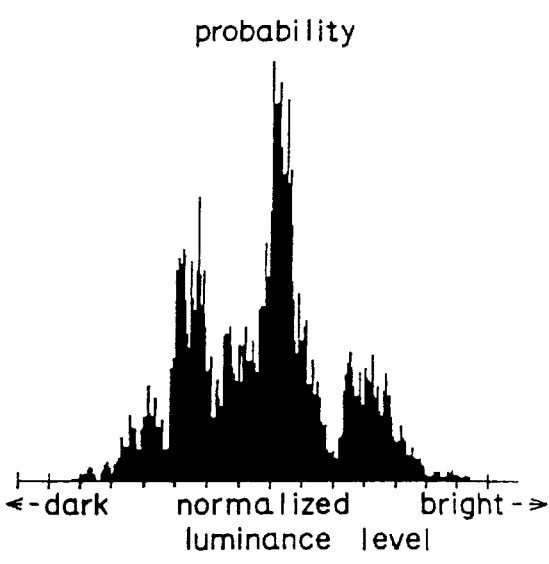
PHOTOGRAPHIC IMAGE
(Modify Histogram)
F I G. 36B
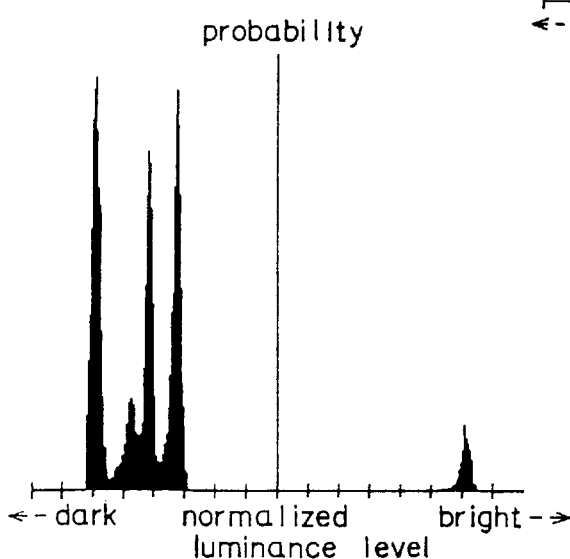
GRAPHIC PATTERN IMAGE
(Modify Histogram)
F I G. 36C

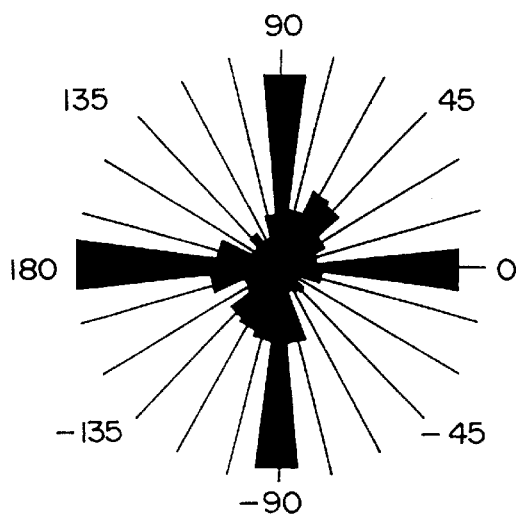
TYPED CHARACTER IMAGE
(Gradient Vector Direction)
F I G. 37A
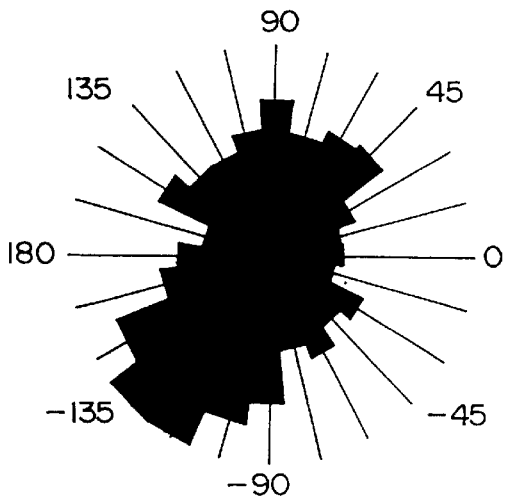
PHOTOGRAPHIC IMAGE
(Gradient Vector Direction)
F I G. 37B
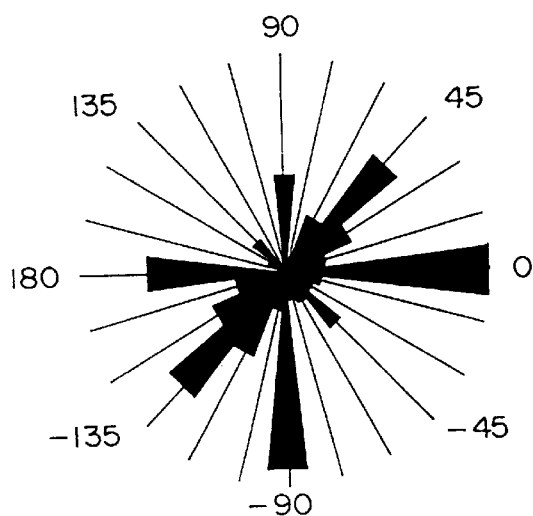
GRAPHIC PATTERN IMAGE
(Gradient Vector Direction)
F I G. 37C

| KIND OF IMAGE | MODIFY HISTOGRAM | | | GRADIENT VECTOR DIRECTION | |
|---|---|---|---|---|---|
| | BIMODALITY | MULTI-MODALITY | UNIMODALITY | AZIMUTH DEPENDENCY | NO AZIMUTH DEPENDENCY |
| TYPED CHARACTER IMAGE | ○ | | | | |
| HANDWRITTEN CHARACTER IMAGE | ○ | | | | |
| PHOTOGRAPHIC IMAGE | | | ○ | | ○ |
| GRAPHIC PATTERN IMAGE | | ○ | | ○ | |
| BACKGROUND | | | | | ○ | ns
IMAGE PROCESSING APPARATUS FOR PERFORMING ADAPTIVE DATA PROCESSING IN ACCORDANCE WITH KIND OF IMAGE

This application is a continuation of application Ser. No. 08/123,533, filed Sep. 17, 1993, now abandoned.

BACKGROUND OF THE INVENTION

1. Field of the Invention

The present invention generally relates to an image processing apparatus and, more particularly, to an image processing apparatus for dividing an in put image (to be referred to as a composite image hereinafter) having various kinds of input images, e.g., a typed character image, a handwritten character image, a photographic image, and a graphic pattern image, into areas of the respective kinds of images, and performing image processing such as data compression.

2. Description of the Related Art

Conventionally, when an image having continuously changing gradation (to be referred to as a continuous gradation image) such as a composite image (document image) having a character image, a graphic pattern image, a photographic image, and the like is to be filed as digital data, the image data is compressed to perform efficient data transfer for storing or communicating the data.

When a composite image is to be imaged by an image pickup unit, and image processing such as data compression is to be performed, it is generally desirable that the image be divided into areas having relatively different characteristics, e.g. a character area, a graphic pattern area, and a photographic area, and processing suitable for each area be performed.

As a method of dividing such a composite image into a character string area, a graphic pattern area, a photographic area, and the like, the following method is generally used. In this method, an overall image is decomposed into coupled components, and some kind of integration is performed to set areas as groups of the coupled components.

For example, as disclosed in "Image Area Division Scheme for Composite Image Having Character Image and Graphic Pattern Image (Halftone Image, Photographic Image)" [THE TRANSACTIONS OF THE INSTITUTE OF ELECTRONICS, INFORMATION AND COMMUNICATION ENGINEERS OF JAPAN, D-II, Vol. J75-D-II, No. 1, pp. 39–47, Jan. 1992], the following conventional scheme is used to determine a character image. First, edge emphasis processing is performed. Ternary processing is then performed by determination processing based on a proper threshold value. Areas in which black and white pixels continue are subjected to pattern matching to detect edge areas, thereby determining character image areas.

In addition, as disclosed in Jpn. Pat. Appln. KOKAI Publication No. 61-296481, there is proposed a document reader in which an input binary document image is reduced, and neighboring black pixels are integrated to detect an area.

As shown in FIG. 40, this document reader comprises an image information storage section 401 for storing binary image (document image) data obtained by optically scanning a document and photoelectrically converting the resultant data, a reduced image storage section 402 for dividing the document image data stored in the image information storage section 401 into small areas, reducing each small area to one pixel, and storing the resultant data, a black pixel integrating section 403 for scanning the reduced image data in a character-string direction and integrating neighboring black pixels, and an area detecting section 404 for detecting areas, of the image obtained by the black pixel integrating section 403, in which black pixels are coupled to each other as image areas.

The binary document image data stored in the image information storage section 401 is divided into small areas, each consisting of a predetermined number of pixels. If the number of black pixels in each small area is equal to or larger than a predetermined threshold value, a black pixel is assigned to each area. If the number of black pixels is less than the threshold value, a white pixel is assigned to each area. The resultant data is then stored in the reduced image storage section 402.

The black pixel integrating section 403 scans the reduced image data in a character-string direction and converts a white run having a length smaller than a predetermined threshold value into a black run, thus integrating neighboring black pixels. In the area detecting section 404, areas, of the image obtained by the black pixel integrating section 403, in which black pixels are coupled to each other are detected as image areas. With this operation, the image areas contained in the document can be detected.

A conventional image information processing system has a processing function of classifying an input composite image according to the kinds of images and converting the classified data into digital data.

One purpose of this processing is to minimize the total data amount of a composite image, when the composite image is stored in a storage medium in the form of digital data, while desired information quality is maintained, by using compression methods which allow data compression with the maximum efficiencies for all kinds of images. The other purpose is to adaptively select binarization methods to obtain better images when images classified as binary gradation images, e.g., character and line images, and continuous gradation images, e.g., a photographic image are expressed as binary images.

There are proposed various processing methods of dividing and classifying the composite image into description areas for all kinds of images. In many of these methods, feature amounts based on the kinds of images are extracted, and the extracted feature amounts are judged by predetermined estimation functions or decision functions, thus determining kinds of images. In many conventional image processing schemes, the frequency of occurrence of black pixels or edges, a luminance level histogram, a spatial frequency distribution, a line segment directivity distribution, and the like within a predetermined block area of an image are used as feature amounts. In addition, Jpn. Pat. Appln. KOKOKU Publication No. 4-18350 discloses a classification processing method using a density gradient frequency distribution of an input image as a feature amount, which is also used in the present invention. In this method, density gradients of a digital image as an input image are obtained in units of pixels in the horizontal and vertical directions, and directions calculated from the values of the obtained horizontal and vertical density gradients are counted in a divided small area, thereby obtaining its frequency distribution. The variance of the frequencies is calculated from the frequency distribution, and the variance is compared with a predetermined threshold value to determine whether the area is a character area or not.

In order to properly perform classification of image data by using the above-described conventional methods, the image data needs to be an ideal image in a relatively good state, including no noise and the like. In reality, however, input image data tends to be influenced by illumination irregularity, stains of a file document, or the like. In such an image, the contrast locally decreases or noise is generated. As a result, detection of black pixels and edge extraction cannot be performed stably. Therefore, it is very difficult to accurately determine kinds of images by using the conventional methods using black pixel detection and edge extraction as parameters.

Furthermore, in order to perform the above-described area division of a composite image without omitting end portions of image areas, it is required that the edge portions such as the end points of characters be faithfully reflected in reduction of an image. In the conventional techniques, however, an input binary composite image is divided into small areas, and a black pixel is assigned to each small area in which the number of black pixels is equal to or larger than a threshold value. If, therefore, the threshold value is larger than "0", a small area located at an end of an image area is not detected, resulting in omission of a portion. If the threshold value is set to be "0", a large amount of noise is picked up, and correction division processing cannot be performed.

In addition, in a reverse monochrome composite image, the overall document image is extracted as a large area.

The above-described distribution of directions calculated from a density threshold value can properly reflect the directivity distribution of edge portions of an image. Therefore, this distribution represents an effective feature amount for determining whether a given image is a typed character image having many edge components in the vertical and horizontal directions, for the difference between a typed character image and other kinds of images is conspicuous. To use the variance of distributions as an estimation criterion for performing determination on the basis of this feature amount is to observe localization of the directivity of edges. In addition, calculation of this variance can be performed with a relatively small calculation load, and hence this method is practical.

If only the variance of the direction distributions of density gradients is used for threshold determination, accurate determination is difficult to perform with respect to the following images: a so-called low-contrast image in which the range of luminance (density) levels is narrow; an image in which the ratio of the occupied area of character edge portions to a determination target small area is small; and an image in which the lines of a character are narrow; because the variance is reduced even if the image to be processed is a typed character image. This is because the direction distribution of density gradients of a background increases in frequency, and the relative difference in direction distribution between the background and a character portion cannot be recognized. Since the direction distribution of density gradients of a background generally has no direction dependency, the direction dependency of the direction distribution of the edges of a character portion is hidden by the distribution of the background.

Furthermore, when various kinds of images (a handwritten character image, a photographic image, a graphic pattern image, and a background image) as well as a typed character image are to be selected and classified, these images cannot be discriminated from each other at all by only observing the variance of the direction distribution of density gradients.

SUMMARY OF THE INVENTION

It is, therefore, an object of the present invention to provide an image processing apparatus which can perform image processing, e.g., image data compression for increasing the data compression ratio of an overall composite image, suitable for each kind of image to achieve an improvement in image quality.

In order to achieve the above object, according to the first aspect of the present invention, there is provided an image processing apparatus comprising image input means for inputting image data including various kinds of information, image data converting means for converting the input image data from the image input means into monochrome image data, binarization means for converting the monochrome image data output from the image data converting means into binary image data, reducing means for converting the binary image data from the binarization means into reduced image data, constituent element area extracting means for extracting a continuous element area constituting an image from the reduced image data output from the reducing means, kind-of-image determining means for determining a kind of image included in the binary image data from the binarization means, for each predetermined area of the continuous element area extracted by the constituent element area extracting means, on the basis of kinds of images classified in advance on the basis of information, and data compressing means for selecting a suitable data compression scheme in accordance with the continuous element area extracted by the constituent element region extracting means and the kind of image determined by the kind-of-image determining means, and compressing the image data from the image input means.

According to the second aspect of the present invention, there is provided an image processing apparatus for dividing composite image data having character, graphic pattern, and photographic data into areas of a character string, a graphic pattern, and a photograph, comprising an image memory for storing the composite image data, edge extraction/binarization means for extracting edge data from the composite image data stored in the image memory and converting the edge data into binary image data, image reducing means for dividing the binary image data from the edge extraction/binarization means into small areas, each constituted by a predetermined number of pixels, and reducing each small area to one pixel, block processing means for integrating black pixel areas in reduced image data from the image reducing means to form blocks, and rectangular area extracting means for obtaining diagonal coordinates of an image-area-circumscribed rectangle from a range in which black elements coupled to each other upon formation of blocks by the block processing means are present.

According to the third aspect of the present invention, there is provided an image processing apparatus comprising an image frame memory for storing digital image data of a composite image having a character image, a graphic pattern image, and a photographic image, homogeneous image area dividing means for dividing image data output from the image frame memory into homogeneous image areas for the same kinds of images, and outputting data indicating positions and sizes of the homogeneous image areas, search block area selecting means for selecting/extracting a small region having a predetermined size in accordance with the data from the homogeneous image area dividing means, and outputting data indicating a position and a size of the small area, a determination target block image memory for reading out image data corresponding to the small area, selected by the search block area selecting means, as a determination target area, from the image frame memory, and temporarily storing the read image data, difference detecting means for detecting difference data from the image data of the determination target area temporarily stored in the determination target block image memory, luminance level modifying means for calculating a modification parameter for luminance modification on the basis of the difference data from the difference detecting means, and calculating a modified luminance level from the image data of the determination target area on the basis of the modification parameter, vector quantization means for performing vector quantization with respect to the difference data from the difference detecting means and the modified luminance level data from the luminance level modifying means, quantized vector counting means for counting components of a quantized vector from the vector quantization means, a neural network for inputting the components of the quantized vector, counted by the quantized vector counting means, and outputting a predetermined kind-of-image determination result, and kind-of-image determining means for estimating/determining the kind-of-image determination result output from the neural network, and outputting data indicating the determined kind of image together with position and size data of the homogeneous image area.

In the image processing apparatus having the arrangement according to the first aspect, a digital image file is loaded, as image data, by an image input section, and the image data is input to a binarization section. In the binarization section, the image data is binarized after edge extraction or black pixel extraction is performed, and the binary data is input to a reducing section to facilitate extraction of the boundaries of constituent areas, thus performing reduction processing. The reduced binary image data output from the reducing section is input to a boundary extracting means for extracting the boundaries of continuous constituent elements, thus detecting the boundaries. Kind-of-image determination processing is sequentially performed with respect to partial areas of the detected constituent elements, thus determining the kinds of images, and data compression processing suitable for all the kinds of images are performed.

In the image processing apparatus according to the second aspect, edge data is extracted from image (document image) data having different kinds of input image data, e.g., typed character data, handwritten character data, photographic data, and graphic pattern data, and binarization processing is performed. The resultant binary image data is divided into small areas, each consisting of a predetermined number of pixels without omitting end portions of an image area. Even a reverse monochrome composite image can also be efficiently divided into small areas. Each small area is reduced to one pixel, and black pixel areas in the reduced image are integrated into blocks. The diagonal coordinates of an image-area-circumscribed rectangle are obtained from a range in which black pixels coupled to each other upon formation of the blocks are present, thereby dividing the image into homogeneous image areas.

In the image processing apparatus according to the third aspect, input composite image date is accurately divided into homogeneous image areas, and a determination target area is set in a homogeneous image area. Vector quantization is performed with respect to shapes distributed in a three-dimensional orthogonal space defined by three parameters, e.g., a horizontal difference value, a vertical difference value, and a modified luminance level, thereby patterning the shapes into models. The distribution patterns as models are recognized by a neural network to determine kinds of images. As a result, the composite image is divided into image areas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of an image processing apparatus according to the first embodiment of the present invention;

FIG. 2 is a block diagram showing an arrangement for performing black pixel extraction;

FIG. 3 is a block diagram showing an arrangement for performing binarization and edge extraction processing;

FIG. 4 is a block diagram showing an arrangement for extracting the boundaries of continuous constituent element areas;

FIG. 5A is a block diagram showing an arrangement for extracting features based on the differences between the kinds of images from statistical data in advance, and determining an estimation criterion for determination;

FIG. 5B is a block diagram showing an arrangement for actually determining the kinds of images by using the obtained estimation criterion;

FIG. 6 is a block diagram showing a schematic arrangement of an image processing apparatus of the present invention;

FIG. 7 is a block diagram showing the arrangement of an image processing apparatus according to the second embodiment of the present invention;

FIG. 8 is a view for explaining difference/binarization processing in the image processing apparatus shown in FIG. 7;

FIG. 9 is a view for explaining an isolated point removing filter in the second embodiment of the present invention;

FIG. 10 is a view for explaining labeling processing in the second embodiment;

FIG. 11 is a view for explaining extraction of a rectangular area;

FIGS. 12A and 12B are views showing a first example of an output image in each process;

FIG. 14 is a view showing a third example of an output image in each process;

FIG. 19 is a view showing a third example of an output image in each process;

FIG. 22 is a block diagram showing the arrangement of an image processing apparatus according to the fourth embodiment of the present invention;

FIG. 23 is a block diagram showing another arrangement for performing binarization with a threshold value in the fourth embodiment;

FIG. 24 is a view for explaining edge extraction using a differential filter in the fourth embodiment;

FIG. 26 is a view for explaining block processing by means of short white run/black run conversion in the fifth embodiment;

FIG. 27 is a block diagram showing the arrangement of an image processing apparatus according to the sixth embodiment of the present invention;

FIG. 28 is a view for explaining a method of dividing a composite image into homogeneous image areas in the sixth embodiment;

FIGS. 29A, 29B, and 29C are views for explaining a method of modifying luminance levels in the sixth embodiment;

FIG. 32 is a block diagram showing the arrangement of a vector quantizer using a neural network used in the sixth embodiment of the present invention;

FIG. 33 is a block diagram for explaining a method of estimating a kind-of-image determination result in the sixth embodiment;

FIGS. 36A, 36B, and 36C are graphs showing a first typical example of the feature pattern of each kind of image, indicated by gradient vector azimuths and modified luminance levels in the seventh embodiment;

FIGS. 37A, 37B, and 37C are graphs showing a second typical example of the feature pattern of each kind of image, indicated by gradient vector azimuths and modified luminance levels in the seventh embodiment;

DETAILED DESCRIPTION OF THE PREFERRED EMBODIMENTS

Figure 13A:
FIGS. 13A and 13B are views showing a second example of an output image in each process.
Figure 13B:
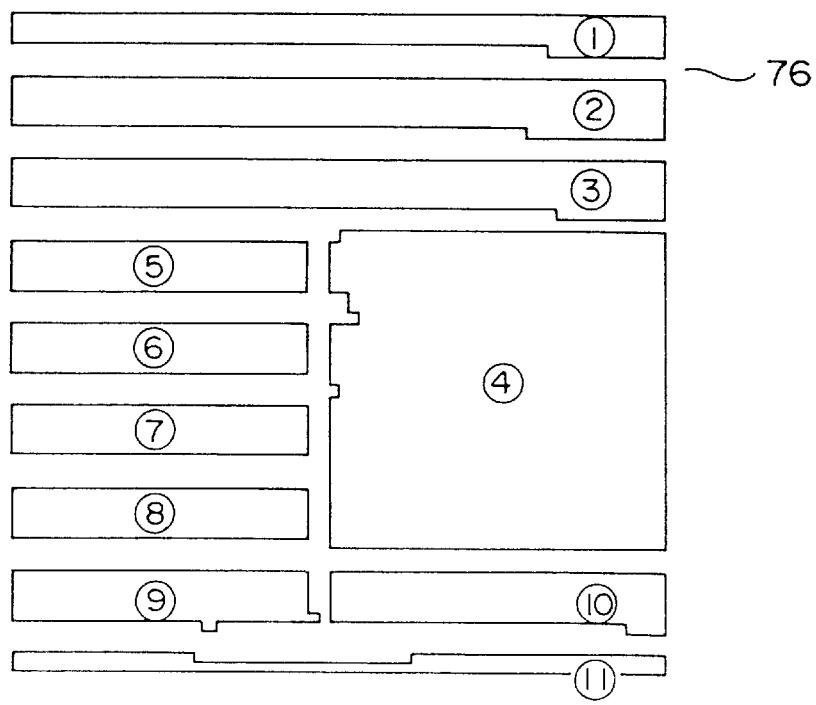

Reference will now be made in detail to the presently preferred embodiments of the invention as illustrated in the accompanying drawings, in which like reference characters designate like or corresponding parts throughout the several drawings.

FIG. 1 shows the arrangement of an image data compressing apparatus as the first embodiment of the present invention.

In this image data compressing apparatus, an image input section 1 is constituted by an optical system 1a, a solid-stage image pickup element 1b such as a CCD, and an A/D converter (not shown), and is designed to load a color image constituted by an input binary image or continuous gradation image upon converting it into digital image data.

Image data output from the image input section 1 is input to a color/monochrome converting section 2, which converts the loaded color image into data consisting of only luminance (lightness) components and outputs it as monochrome image data. This processing is performed to reduce the amount of data handled at the early stage in image area division processing for specifying the kinds of images and extracting corresponding areas, thereby simplifying the subsequent processing.

The monochrome image data output from the color/monochrome converting section 2 is input to a binarization section 3 to be subjected to binarization. The binarization section 3 performs black pixel extraction processing or edge extraction processing.

The above-described processing will-L be described in detail below with reference to FIGS. 2 and 3.

FIG. 2 shows an arrangement for performing black pixel extraction processing.

Horizontal and vertical difference calculating sections 11 and 12 perform difference processing with respect to the monochrome image data, at intervals of a predetermined number of pixels, in the horizontal and vertical directions of the image, respectively. Binarization sections 13 and 14 set a proper threshold value with respect to the data obtained by this difference processing, and perform binarization in such a manner that when the absolute value of difference data is smaller than the threshold value, "0" is set; otherwise, "1" is set.

A synthesizing section 15 logically ORs the respective horizontal and vertical binary data. The data is divided again into horizontal and vertical data, and all continuous "0"s between "1" and "1" are set to "1" in black pixel reproducing sections 16 and 17.

A synthesizing section 18 logically ORs the resultant horizontal and vertical binary data to obtain a black pixel bit map.

Another method of performing binarization in the binarization section 3 and an example of edge extraction processing will be described next with reference to FIG. 3. Similar to the process of forming the black pixel bit map, difference processing of monochrome image data is performed, at intervals of a predetermined number of pixels, in the horizontal and vertical directions of the image, respectively, by horizontal and vertical difference calculating sections 21 and 22.

Binarization sections 23 and 24 set a proper threshold value with respect to the data obtained by this difference processing, and perform binarization in such a manner that "0" is set when the absolute value of difference data is smaller than the threshold value, and "1" is set when the absolute value of difference data is larger than the negative threshold value. In this case, "1" is set only when the absolute value of difference data is smaller the negative threshold value, in order to extract only one of the edges of a binary line segment constituted by two pairs of positive and negative differences. This processing is performed to reduce the dependency of the feature parameters of a character image or the like on a change in thickness of its line segment. The horizontal and vertical binary data are logically ORed by a synthesizing section 25 to obtain binary image data by edge extraction.

The overall flow of processing will be described again with reference to FIG. 1.

Binary image data output from the binarization section 3 is input to a reducing section 4 and is reduced thereby. Reduction processing is realized by performing simple thinning of pixels at proper intervals. With this reduction processing, in the binary image data, the separation of areas, such as spaces, including no image constituent elements from areas including image constituent elements becomes more clear.

The data itself is then reduced to reduce the processing load. The output from the reducing section 4 (i.e., reduced image data) is input to a continuous constituent element boundary extracting section 5. For example, this boundary extraction is performed by the arrangement shown in FIG. 4.

Binary data output from a thinning section 26 serving as the reducing section 4 is filtered by an LPF (low-pass filter) 27 to be subjected to, e.g., difference processing in the horizontal and vertical directions. The data obtained by the difference processing is then subjected to edge extraction in an edge extracting section 28 with a threshold value.

In a boundary calculating section 29, the boundary of a continuous constituent element area can be calculated by performing linear approximation of horizontal and vertical lines using the extracted edge data. As this linear approximation, approximation based on the least squares method can be used. As a result, rectangular areas, each constituted by a plurality of constituent elements, are obtained.

The kinds of images in the respective areas are sequentially determined by a kind-of-image determining section 6 on the basis of the area data output from the continuous constituent element area boundary extracting section 5.

Determination of the kinds of images will be described in detail below with reference to FIGS. 5A and 5B. FIG. 5A shows the process of determining an estimation criterion for determination by extracting features based on the differences between the kinds of images from statistical data in advance. FIG. 5B shows the process of actually performing determination of the kind of image by using the obtained estimation criterion. An edge extraction section 31 in FIG. 5A corresponds to the binarization sections 13, 14, 23, and 24 described with reference to FIGS. 2 and 3.

The extracted edge data is effectively used to reduce illumination irregularity and the like in the original input image. In addition, by using the edge extraction method described with reference to FIG. 3, the dependency of feature parameters on the thicknesses of line segments constituting a character image can be reduced. The binary image data output from the edge extraction section 31 is statistically sampled a plurality of times at intervals of a predetermined number of blocks, and the resultant data are subject to KL conversion in a KL converting section 32. In the KL converting section 32, the binary image data of each block represented by the normalized orthogonal vector of the number of pixels constituting each block is converted into uncorrelated data. The base vector of each uncorrelated data is calculated by a base vector extracting section 33.

As binary image data subjected to base vector calculation, an image sample having various kinds of images is used. Therefore, arbitrary block data of the image data having various kinds of image data is used. The calculated base vectors are input to an inner product calculating section 34, in which the inner products of the base vectors and the binary image data output from the edge extraction section 31 are calculated in units of blocks. Each inner product data represents the component value of each calculated base vector, and a feature amount corresponding to each kind of image can be obtained. The feature amounts as the inner products for the respective base vectors are input to a neural network section 35.

Although vector data input to the neural network section 35 may be set to be equal in number to the above-mentioned base vectors, vectors that represent the feature amounts better may be preferentially selected to input only effective vectors to the neural network section 35. The neural network section 35 uses a hierarchical network. In order to use an output from the neural network section 35 as the number of the kinds of images to be determined, teacher data are input from a teacher data input section 36 in units of block data manually sampled, thus performing a learning operation. Learning may be performed by a general reverse propagation method.

The network constructed by pre-learning in units of block areas is a circuit for determining a binary pattern vector on the basis of the difference in kind between images represented by binary image data. When binary pattern data is input to this determination circuit, determination of the kinds of images can be executed. The reason why the neural network is used to determine the feature amount of each vector obtained by KL conversion is that a slight difference between feature amounts can be determined with higher precision.

In the actual process of determination shown in FIG. 5B, an output from an edge extracting section 37 is input to an inner product calculating section 38, and the inner products of the binary image data output from the edge extraction section 31 and the base vectors previously obtained in units of blocks are calculated. The resultant outputs are input to the neural network 39 constructed by pre-learning to determine the kinds of images, thus outputting data representing the determined kinds of images.

In the arrangement shown in FIG. 1, kind-of-image determination result data output from the kind-of-image determining section 6 is supplied to a data compressing section 7, and a data compression method is selected. Output image data from the image input section 1 is then compressed by the corresponding data compression method. In this case, as is apparent, area position and size data output from the boundary extracting section 5 and data of only portions where the image data are present are selectively subjected to data compression. Therefore, the data compressing section 7 outputs the position and size data of a plurality of partial areas where the image data are present, the kind-of-image data of the respective areas, and the compressed data of the respective areas.

As described in detail above, according to the image processing apparatus of the first embodiment, there is provided an image data compressing apparatus in which when a composite image input in the presence of external disturbance such as illumination irregularity is to be handled, binary pattern data resistant to external disturbance is processed by effectively performing optimal coordinate axis transform and neural determination, thereby reducing the total data count of a composite image file, and allowing high-precision image area division for each kind of image.

In addition, according to the embodiment, binarization and data reduction are performed at the early stage of image area division processing so that the number of image data and the number of portions at which the kinds of images are determined can be reduced, thereby providing an image data compressing apparatus with high realizability, which can reduce the processing load, and facilitates the formation of hardware.

The concept of area division in an image processing apparatus as the second embodiment of the present invention will be described next with reference to FIG. 6.

This image processing apparatus comprises an image memory 45 for storing document image data loaded by an image pickup unit (not shown), an edge extraction/binarization section 46 for performing edge extraction with respect to the document image data stored in the image memory 45 and binarizing the resultant data, an image reducing section 47 for reducing the document image data binarized by the edge extraction/binarization section 46, a block processing section 48 for coupling neighboring black elements in the reduced image data into blocks, and a rectangular area extracting section 49 for obtaining the diagonal coordinates of a circumscribed rectangle from the range in which the coupled black pixels in the image data which has undergone block processing are present.

The arrangement of the image processing apparatus of the second embodiment will be described in detail below with reference to FIG. 7.

The edge extraction/binarization section 46 of the image processing apparatus comprises a luminance converting circuit 50 for converting 24-bit full color document image data, loaded by an image pickup unit (not shown) and stored in the image memory 45, into 8-bit monochrome image data, a gradation image memory 51 for storing the monochrome image data, a horizontal difference processing circuit 52 for scanning the monochrome image data, stored in the gradation image memory 51, in the horizontal direction to obtain a difference value, a binarization circuit 53 for binarizing the difference value, a horizontal binary image memory 54 for storing the horizontal difference binary image data, a vertical difference processing circuit 55 and a vertical binary image memory 56 for performing the same operations as those of the horizontal difference processing circuit 52 and the horizontal binary image memory 54 in the vertical direction, an OR operation circuit 57 for logically ORing the binary image data stored in the binary image memories 54 and 56 to obtain edge binary image data, and a binary image memory 58 for storing the binary image data as the OR operation result.

The image reducing section 47 comprises an image reducing circuit 59 for reducing the binary image data stored in the binary image memory 58, a reduced image memory 60 for storing the reduced image data, and a filter processing circuit 61 for removing isolated points in the reduced image data stored in the reduced image memory 60.

The block processing section 48 comprises a long white run detecting circuit 62 for scanning the filtered image data from the filter processing circuit 61 in the vertical and horizontal directions to detect a white run (long white run) having a predetermined value or more, a block image memory 63 for storing the detected long white run as block image data, and a label processing circuit 64 for labeling the block image data stored in the block image memory 63.

The rectangular area extracting section 49 comprises an address extracting circuit 65 for extracting the diagonal coordinates (address data) of the circumscribed rectangle of each block from a range in which black pixels to which the same label is provided by the label processing circuit 64 are present, an address memory 66 for storing the extracted address data, and an address translating circuit 67 for translating the address data stored in the address memory 66 into the address data of the image before data reduction.

In the image processing apparatus having the above-described arrangement, 24-bit full color document image data loaded by the image pickup unit and stored in the image memory 45 is converted into 8-bit monochrome image data by the luminance converting circuit 50 and is stored in the gradation image memory 51. As the luminance converting circuit 50, various circuits can be considered. For example, the circuit may be designed to multiply R, G, and B data by predetermined values, respectively, and calculate the sum total of the products. The horizontal difference processing circuit 52 scans the monochrome image data stored in the gradation image memory 51 in the horizontal direction to obtain a difference value. The horizontal difference processing circuit 52 binarizes the difference value and supplies it to the horizontal binary image memory 54.

Such an operation will be described below with reference to FIG. 8.

FIG. 8 is an enlarged view of a partial image 68 of a document image, together with gradation image data 69 corresponding to the partial image 68, and a binary image 70 corresponding to the partial image 68 and stored in the horizontal binary image memory 54.

In the partial image 68, one square represents one pixel. The gradation image data 69 is processed as follows. The gradation image data corresponding to the partial image 68 stored in the gradation image memory 51 is scanned in the horizontal direction to obtain the difference between neighboring pixels. If, for example, the difference value exceeds 50, the corresponding portion is regarded as an edge, and "1" (black) is assigned to one of neighboring pixels which has a lower luminance, thus performing binarization. The resultant data is then stored in the horizontal binary image memory 54.

Similarly, the vertical difference processing circuit 55 obtains difference values in the vertical direction to perform binarization, and supplies the binary data to the vertical binary image memory 56. The OR operation circuit 57 logically ORs the difference binary image data stored in the horizontal binary image memory 54 and the vertical binary image memory 56, and stores the obtained edge binary image data in the binary image memory 58.

The image reducing circuit 59 divides binary image data, consisting of, e.g., 512×512 pixels and stored in the binary image memory 58, into 64×64 small areas, each consisting of 8×8 pixels. In each small area, "1"s are set in pixels which are detected as black pixels, and "0"s are set in pixels which are detected otherwise, thereby forming reduced image data. The reduced image data is then stored in the reduced image memory 60.

The filter processing circuit 61 filters the reduced image data stored in the reduced image memory 60 to remove noise from the data. Although various filters can be considered, for example, a 3×3 isolated point removing filter 71 shown in FIG. 9 is used. With this filter, when eight neighboring pixels around a target pixel have the same value, the value of the target pixel is set to be equal to that of the neighboring pixels. By sequentially scanning reduced image data from the upper left to the lower right, isolated points can be removed. The long white run detecting circuit 62 scans the reduced image data, which has undergone the above-described filter processing, in the vertical and horizontal directions to detect a white run (long white run) having a length of, e.g., 16 pixels or more. "0"s (white pixels) are assigned to portions in which long white runs are detected, and "1"s (black( pixels) are assigned to the remaining portions, thereby integrating black pixel regions to form block image data. The block image data is then stored in the block image memory 63.

The label processing circuit 64 scans the block image data stored in the block image memory 63 to check the coupled states of the respective pixels. For example, the same label is provided to four pixels that are coupled to each other. In this manner, labeling is performed.

This labeling operation will be described below with reference to FIG. 10.

FIG. 10 is an enlarged view of a target pixel x and neighboring pixels in a document image. In the preceding processing, an image has already been binarized such that a white pixel is represented by "0", and a black pixel is represented by "1". Letting $\underline{x}$ (image [i] [j]) be a target pixel, $\underline{a}$ (image [i] [j−1]) be a pixel located above the target pixel, and $\underline{b}$ (image [i−1] [j]) be a pixel located on the left side of the target pixel, labeling is performed under the following conditions:

(1) If x=0, then label 0 is given to the pixel $\underline{X}$.
(2) If a=b and a=0, then a new label is given to the pixel $\underline{x}$.
(3) If a=b and a≠0, then the same label as that of the pixel $\underline{a}$ is given to the pixel $\underline{x}$.
(4) If a>b and b=0, then the same label as that of the pixel $\underline{a}$ is given to the pixel $\underline{x}$.
(5) If a>b and b≠0, then the same label as that of the pixel $\underline{b}$ is given to the pixel $\underline{x}$, and the same label as that of the pixel $\underline{b}$ is given to all the pixels having the same label as that of the pixel $\underline{a}$.
(6) If a<b and a=0, then the same label as that of the pixel $\underline{b}$ is given to the pixel $\underline{x}$.
(7) If a<b and a≠0, then the same label as that of the pixel $\underline{a}$ is given to the pixel, and the same label as that of the pixel $\underline{a}$ is given to all the pixels having the same label as that of the pixel $\underline{b}$. Note that when a target pixel is located at an upper end of an image, a=0, and when a target pixel is located at a left end of an image, b=0.

When this processing is sequentially performed from the upper left position of the image, labeling is completed.

Subsequently, the address extracting circuit 65 scans the block image data which have undergone labeling and are stored in the block image memory 63, and detects horizontal minimum and maximum values ($x_{sn}$, $x_{en}$) and vertical minimum and maximum values ($Y_{sn}$, $Y_{en}$) of the coordinates of pixels to which the same label is given, thus storing them, as the diagonal coordinates (upper left coordinates ($x_{sn}$, $Y_{sn}$) and lower right coordinates ($x_{en}$, $Y_{en}$)) of an image-area-circumscribed rectangle, in the address memory 66. The address translating circuit 67 enlarges the address data stored in the address memory 66 in accordance with the reduction ratio at which data reduction is performed by the image reducing circuit 59, thus converting the data into the address data of the image before data reduction.

If, for example, the reduction ratio in the image reducing circuit 59 is 1/8, address translation is performed according to the following equations, and the contents of the address memory 66 are updated:

$x_s' = x_s \times 8$, $Y_s' = Y_s \times 8$ $x_e' = (x_e+1) \times 8 - 1$, $Y_e' = (Y_e+1) \times 8 - 1$ In this manner, the diagonal coordinate data of the circumscribed rectangle which are stored in the address memory 66 and the original image data stored in the image memory 45 are output as area division processing results.

FIGS. 12A, 12B, 13A, 13B, and 14 show output images in the respective processes.

FIGS. 12A to 14 show an area division target document image 73 constituted by characters and a photograph represented by data stored in the image memory 45, an edge-extracted binary image 74 represented by data stored in the binary image memory 58, a reduced image 75 represented by data stored in the reduced image memory 60, a block-processed image 76 represented by data stored in the block image memory 63, and an image 77 indicating the image area division result of the document image, represented by the data stored in the image memory 45, by using address data stored in the address memory 66.

With this operation, area division can be performed without omitting end portions of image areas. In addition, since an image is cut into rectangular areas, area division of a document image can be efficiently performed.

In the image processing apparatus of the second embodiment, since edge extraction/binarization is performed on the basis of the differences in luminance between neighboring pixels before image data reduction is performed, edge portions such as end points of characters can be faithfully reflected in a reduced image, and no end portions of image areas are omitted. In addition, even a reverse monochrome image can be efficiently divided into image areas.

Furthermore, in this image processing apparatus, since unnecessary black pixels that may cause erroneous area division are removed by performing an isolated point removing filtering operation with respect to reduced image data, the image can be efficiently divided into image areas. In the block processing section, black pixel areas are formed into blocks by detecting long white runs. Even if, therefore, a character string direction is unknown in advance, there is no need to detect short white runs by scanning image data, replace them with black runs, and calculate the AND thereof. This allows efficient image area division. Moreover, in the second embodiment, since labeling is performed with respect to black pixels formed into blocks, the coupled states of the black pixels can be simply expressed, allowing efficient image area division.

An image processing apparatus as the third embodiment of the present invention will be described next with reference to FIG. 15. This image processing apparatus has the same arrangement as that of the second embodiment except that the edge extraction/binarization section 46 in FIG. 7 is modified, and hence only an edge extraction/binarization section 46 of the third embodiment will be described below. Note that the same reference numerals in FIG. 15 denote the same parts as in FIG. 7, and a description thereof will be omitted.

Figure 15:
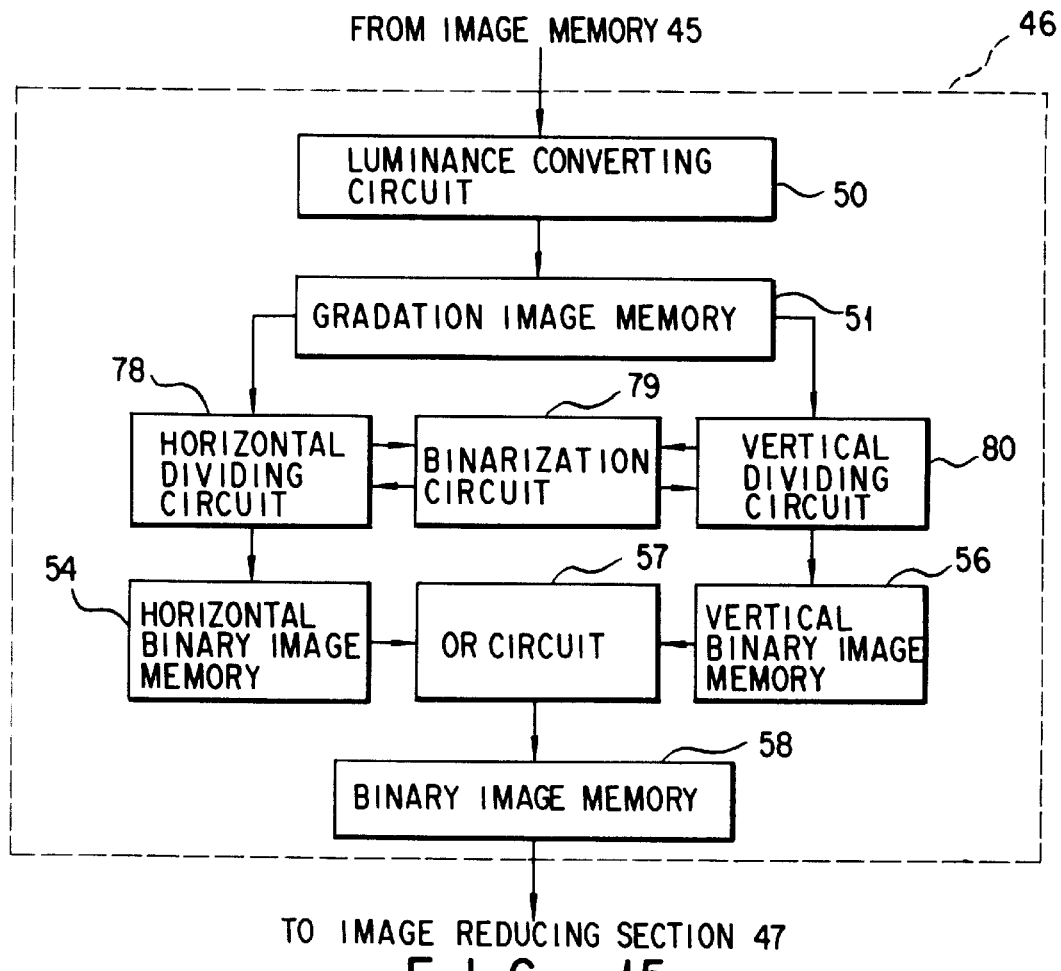
FIG. 15 is a block diagram showing the arrangement of an image processing apparatus according to the third aspect of the present invention.

Referring to FIG. 15, the edge extraction/binarization section 46 includes a horizontal dividing circuit 78 for horizontally scanning monochrome image data stored in a gradation image memory 51 to obtain luminance ratios, a binarization circuit 79 for binarizing the ratios, and a vertical dividing circuit 80 for performing the same operation as that of the horizontal dividing circuit 78 in the vertical direction.

In the image processing apparatus having the above-described arrangement, the horizontal dividing circuit 78 horizontally scans the monochrome image data stored in the gradation image memory 51 to obtain luminance ratios, and the binarization circuit 79 binarizes the ratios and supplies the resultant data to a horizontal binary image memory 54.

This binarization operation will be described with reference to FIG. 16.

Figure 16:
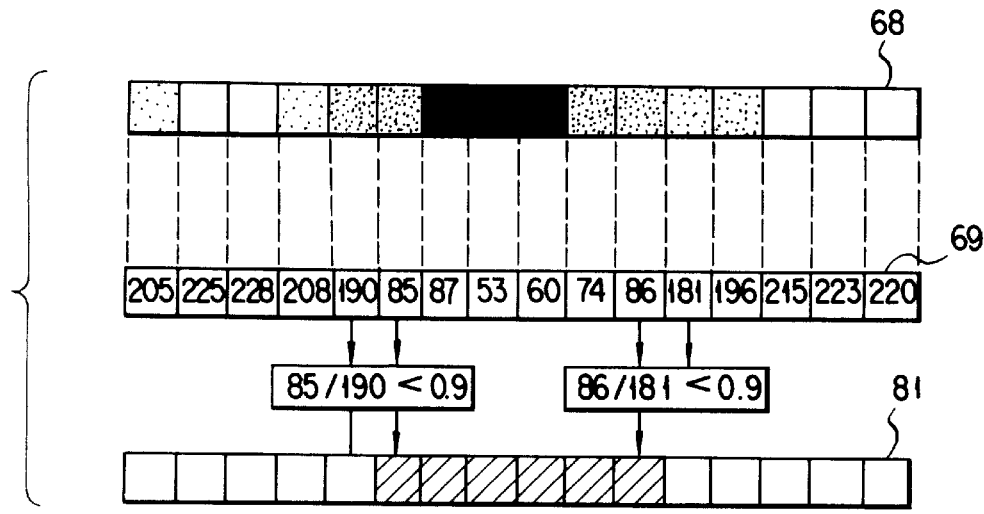
FIG. 16 is a view for explaining ratio/binarization processing in FIG. 15.
Figure 17A:
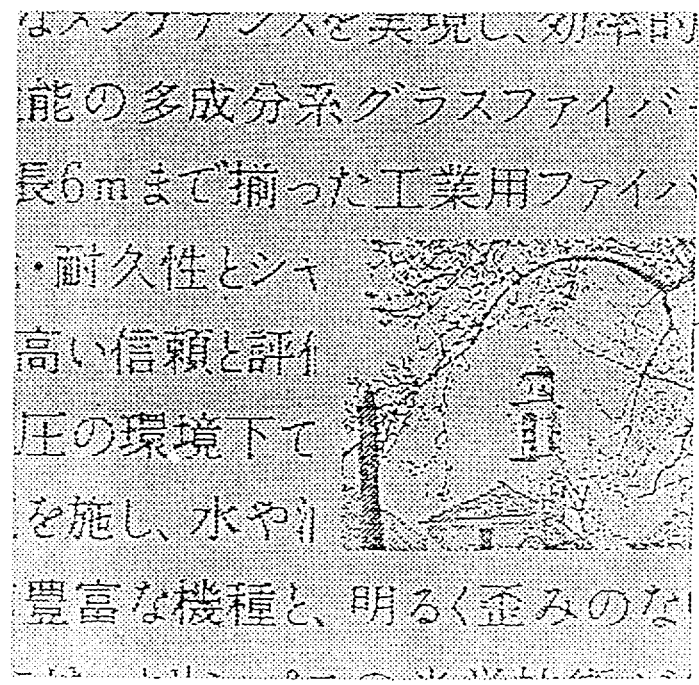
FIGS. 17A and 17B are views showing a first example of an output image in each process.
Figure 17B:
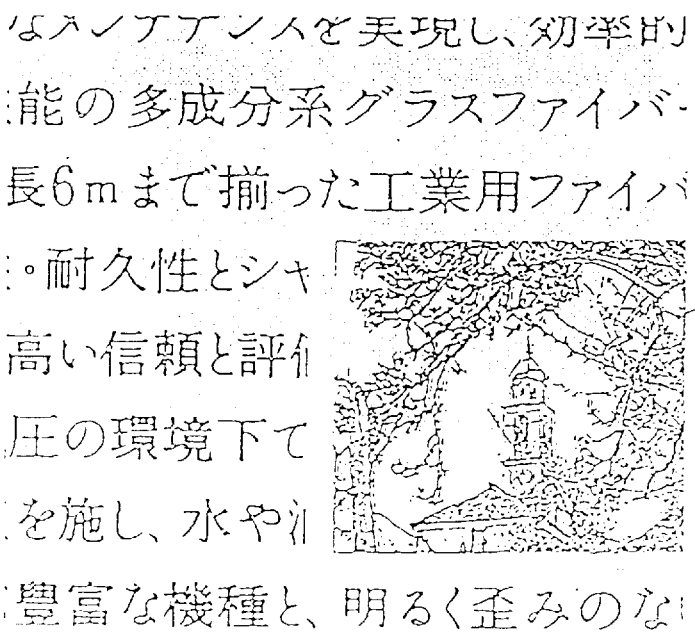
Figure 18A:
FIGS. 18A and 18B are views showing a second example of an output image in each process.
Figure 18B:
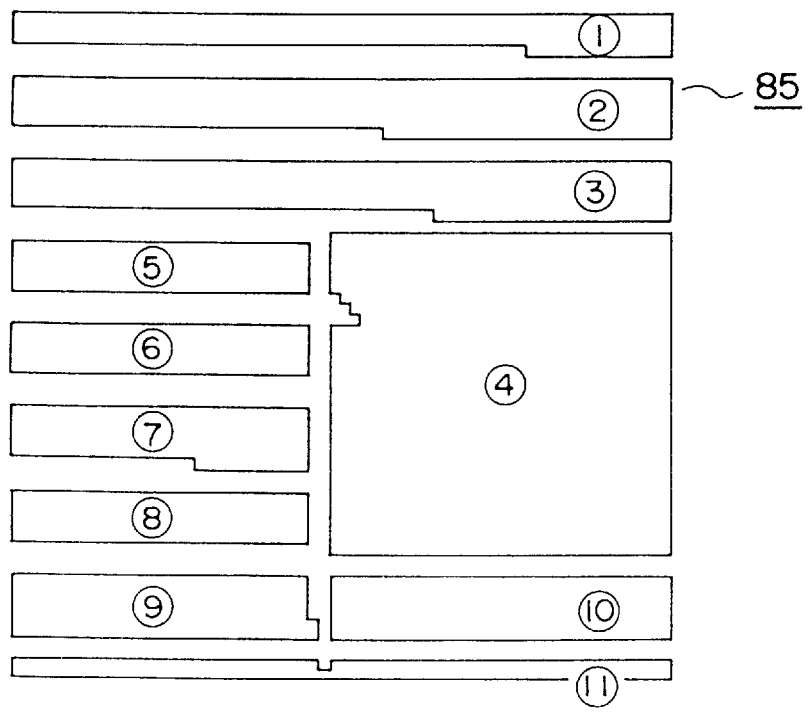

FIG. 16 is an enlarged view of a partial image 68 of a document image together with gradation image data 69 corresponding to the partial image 68, and a binary image 81 corresponding to the partial image 68.

Referring to FIG. 16, the partial image 68 is an enlarged view of a portion of the document image, and one square represents one pixel. The gradation image data 69 is gradation image data corresponding to the partial image 68 and stored in the gradation image memory 51. The binary image 81 is a binary image corresponding to the partial image 68 and stored in the horizontal binary image memory 54. As shown in FIG. 16, the horizontal dividing circuit 78 horizontally scans the gradation image data 69 to check the luminances of neighboring pixels, and obtains the ratios thereof. If, for example, a ratio is less than 0.9, "1" (black) is assigned to one of pixels which has a lower luminance, thus performing binarization. The resultant data is then stored in the horizontal binary image memory 54.

The vertical dividing circuit 80 obtains luminance ratios in the vertical direction in the same manner as described above, and supplies the resultant data to a vertical binary image memory 56.

Area division performed by the same processing as that in the second embodiment will be described next. FIGS. 17A, 17B, 18A, 18B, and 19 show output images in the respective processes in the third embodiment.

Referring to FIGS. 17A to 19, an area division target document image 82 is constituted by characters and a photograph represented by data stored in an image memory 45. A binary image 83 is a binarized image represented by data stored in a binary image memory 58. A reduced image 84 is a reduced image represented by data stored in a reduced image memory 60. A block-processed image 85 is a block-processed image represented by data stored in a block image memory 63. An area division image 86 is an image indicating the image area division result of the document image and represented by data stored in the image memory 45.

With such image processing, area division can be performed without omitting end portions of image areas. In addition, since an image is cut into rectangular areas, area division of a document image can be efficiently performed.

In the image processing apparatus of the third embodiment, since edge extraction/binarization is performed on the basis of the differences in luminance between neighboring pixels before image data reduction is performed, edge portions such as end points of characters can be faithfully reflected in a reduced image, and image area division can be efficiently performed without omitting end portions of image areas. Furthermore, in the third embodiment, since binarization is performed on the basis of the luminance ratios of neighboring pixels, area division of a document image with shading can also be performed.

Letting G be an original image pattern, F be an illumination pattern, and Y be an observed image pattern, the image pattern Y is represented by the product of F and G (Y=F×G or logY=logF+logG). If, therefore, a change in the illumination pattern F is sufficiently moderate as compared with a change in the observed image pattern G, it is considered that the luminance ratios of neighboring pixels are retained even in an image with shading.

In contrast to this, the luminance differences between neighboring pixels are not retained. That is, the luminance difference in a dark portion decreases, and the luminance difference in a bright portion increases. For this reason, edges are not correctly detected in a dark portion. In this embodiment, since edge extraction is performed not by obtaining the luminance differences between neighboring pixels but by obtaining the luminance ratios of neighboring pixels, even a document image with strong shading can be divided into areas. Moreover, in the method of the third embodiment, since even a slight change in luminance can be detected in a low-luminance portion, not only an edge but also a low-luminance portion in which a change in luminance occurs can be simultaneously extracted.

Figure 20:
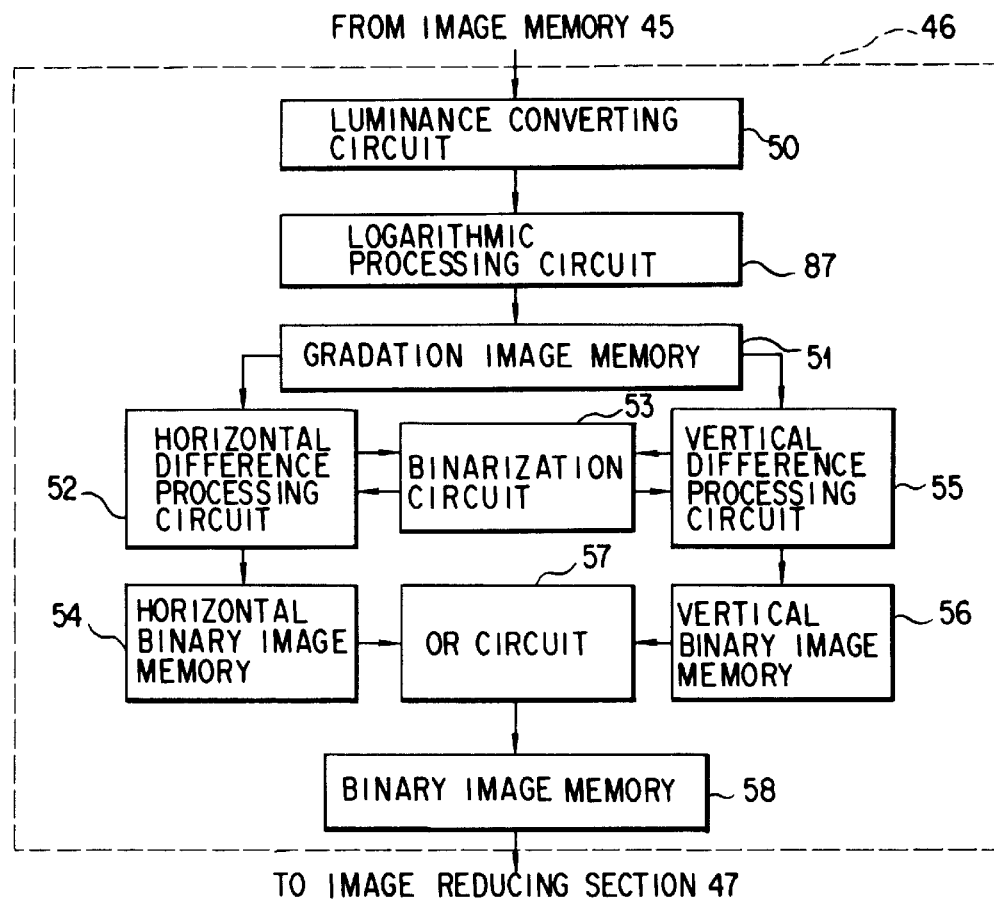
FIG. 20 is a block diagram for explaining logarithmic difference/binarization processing in the third embodiment.

A modification for obtaining the same effects as described above can be realized by replacing the edge extraction/binarization section 46 shown in FIG. 7 with an edge extraction/binarization section 46 having the arrangement shown in FIG. 20. In this circuit, logarithmic luminances are obtained by a logarithmic processing circuit 87 instead of obtaining luminance ratios. The logarithmic luminances are then multiplied by a predetermined value, and the resultant data is stored in a gradation image memory 51. The stored data is scanned in the vertical and horizontal directions to obtain differences. The differences are then binarized.

Such a binarization operation will be described below with reference to FIG. 21.

Figure 21:
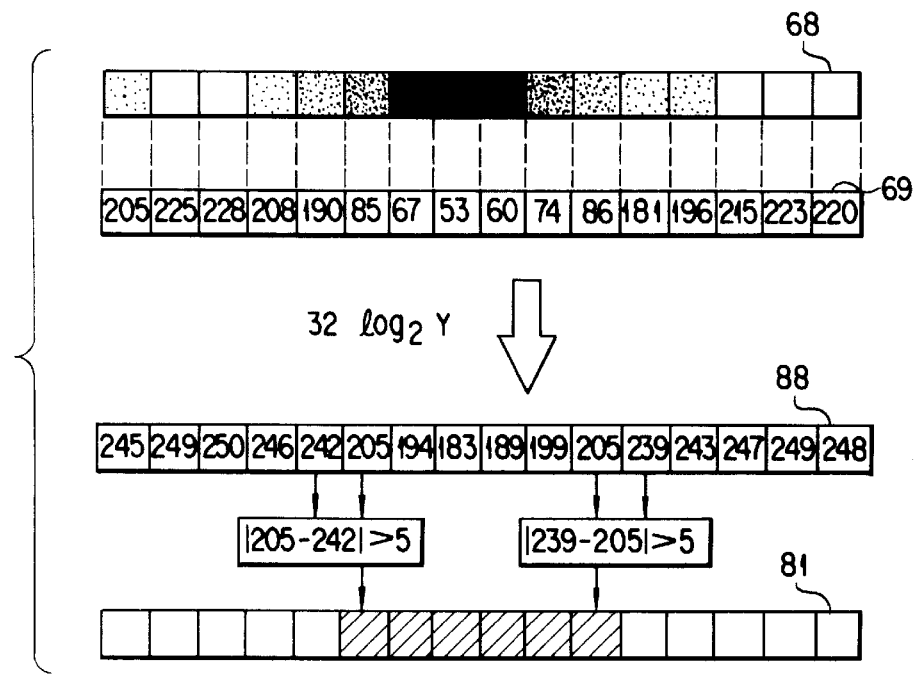
FIG. 21 is a view showing another arrangement for a binarizing operation allowing the same effect as that in the third embodiment.

Referring to FIG. 21, logarithmic luminance data 88 is the data of the logarithmic luminances of the pixels corresponding to the partial image 68 stored in the gradation image memory 51. As shown in FIG. 21, the logarithmic luminance data 88 is horizontally scanned to obtain the differences between neighboring pixels. If, for example, a difference value exceeds 5, "1" (black) is assigned to one of pixels which has a lower logarithmic luminance. In this manner, binarization is performed, and the resultant data is stored in the horizontal binary image memory 54. A binary image 81 is a binary image corresponding to the partial image 68 and stored in the horizontal binary image memory 54. Subsequently, the same processing as that in the first embodiment is performed, and the same effects as those of the arrangement shown in FIG. 15 can be obtained.

The arrangement of an image processing apparatus as the fourth embodiment of the present invention will be described next with reference to FIG. 22. The fourth embodiment has the same arrangement as that of the second embodiment except that the edge extraction/binarization section 46 shown in FIG. 7 is modified. Note that the same reference numerals in FIG. 22 denote the same parts as in FIG. 7, and a description thereof will be omitted.

This image processing apparatus comprises a differential filtering circuit 89 for extracting edge image data from monochrome image data stored in a gradation image memory 51, an edge image memory 90 for storing the edge image data obtained by the differential filtering circuit 89, and a binarization circuit 91 for binarizing the edge image data stored in the edge image memory 90.

In the image processing apparatus having the above-described arrangement, the differential filtering circuit 89 extracts edge image data by performing differential filtering with respect to the monochrome image data stored in the gradation image memory 51, and stores the data in the edge image memory 90.

Although various types of filters can be used as this differential filter, for example, a Laplacian filter is used. The binarization circuit 31 binarizes the edge image data stored in the edge image memory 90 and stores the resultant data in a binary image memory 58. Various types of binarization processing may be considered. For example, the maximum value of the values of a target pixel and eight neighboring pixels, a total of nine pixels, is obtained, and the target value is binarized by using ½ the maximum value as a threshold value. Binarization can also be performed on the basis of a combination of average calculation, variance calculation, calculation of a difference between maximum and minimum values, and the like. Note that when binarization is to be performed by using a fixed threshold value, differential filtering and binarization can be simultaneously performed with the arrangement shown in FIG. 23 as another arrangement of the edge extraction/binarization section 46.

These differential filtering and binarization operations will be described below with reference to FIG. 24.

Referring to FIG. 24, a partial image 92 is an enlarged view of a portion of a document image, and one square represents one pixel. A gradation image data 93 is image data corresponding to the partial image 92 and stored in a gradation image memory 51. Edge image data 95 is obtained by filtering the gradation image data 93 with a Laplacian filter 94. For example, the maximum value of the values of a target pixel and eight neighboring pixels, a total of nine pixels, is obtained, and the target pixel is binarized by using ½ the maximum value as a threshold value. The resultant data representing an edge (binary) image 96 is supplied to a binary image memory 58 to be stored therein. The subsequent processing is performed in the same manner as in the second embodiment, thus performing area division.

With this operation, area division can be performed without omitting end portions of image areas. In addition, since an image is divided into rectangular areas, area division of a document image can be efficiently performed.

In the image processing apparatus of the fourth embodiment, before image data reduction is performed, edge extraction/binarization is performed by utilizing a differential filter so that edge portions such as end points of characters can be faithfully reflected in a reduced image, and image area division can be efficiently performed without omitting end portions of image areas. In addition, in the fourth embodiment, since a two-dimensional differential filter is used as an edge extraction means, a gradation image need not be scanned in both the vertical and horizontal directions, thus allowing a simple arrangement.

Note that after the directivity of a graphic pattern or the like of a target image is recognized, a proper coefficient for the differential filter may be set so as to divide only image areas which are coupled to each other in a specific direction. With this operation, selective, adaptive area division can be performed in accordance with the feature of a target image.

Figure 25:
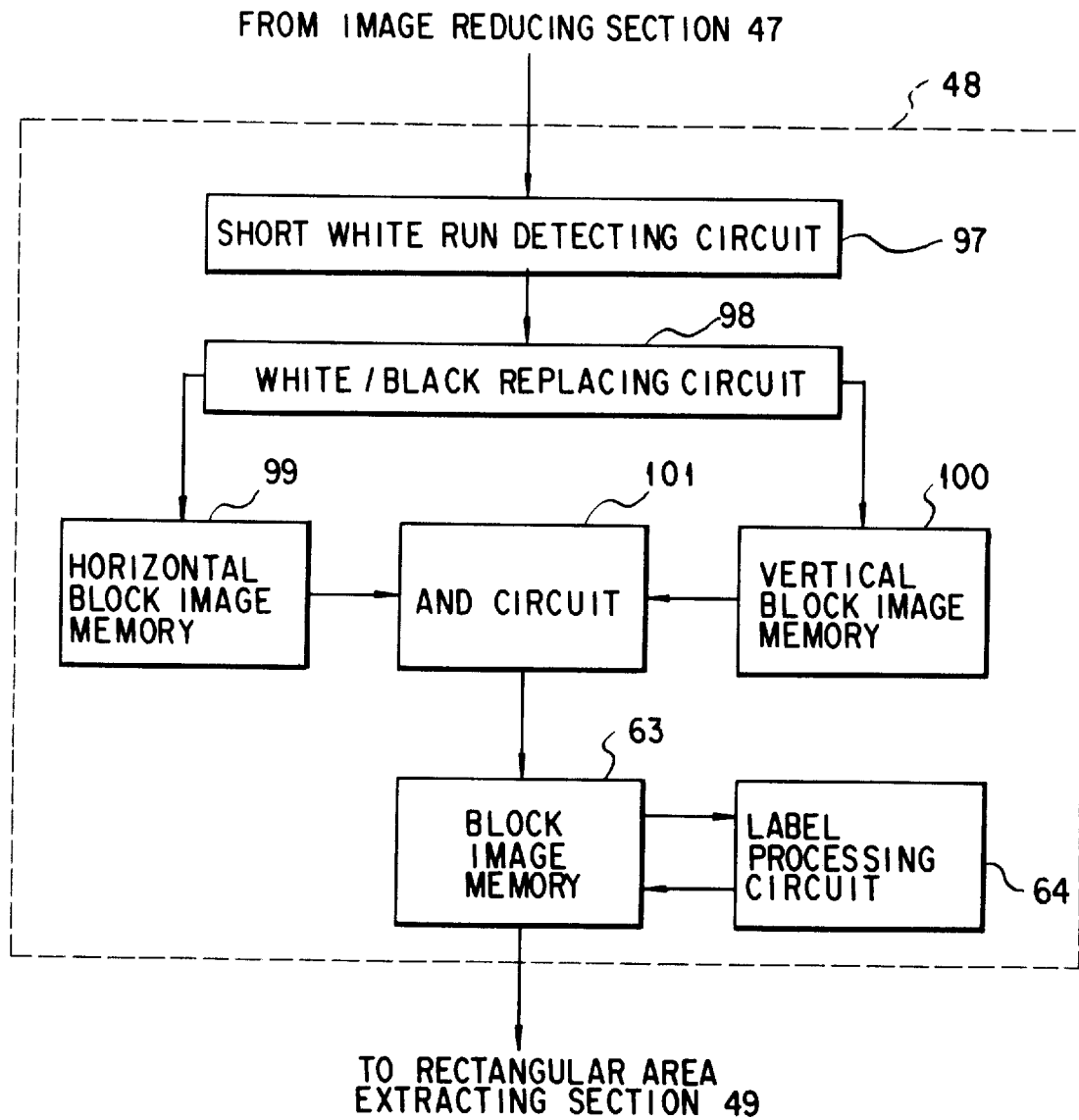
FIG. 25 is a block diagram showing the arrangement of an image processing apparatus according to the fifth embodiment of the present invention.

The arrangement of an image processing apparatus as the fifth embodiment of the present invention will be described with reference to FIG. 25. The fifth embodiment has the same arrangement as that of the second embodiment except that the block processing section 48 shown in FIG. 7 is modified. The same reference numerals in FIG. 25 denote the same parts as in FIG. 7, and a description thereof will be omitted.

This image processing apparatus comprises a short run detecting circuit 97 for vertically and horizontally scanning reduced image data stored in a reduced image memory 60 of an image reducing section 47 in FIG. 7 to detect a white run (short white run) having a predetermined value or less, a white/black replacing circuit 98 for replacing the short white run, detected by the short run detecting circuit 97, with a black run, a horizontal block image memory 99 for storing block image data obtained by replacing a short run with a black run upon horizontal scanning, a vertical block image memory 100 for storing block image data obtained by replacing a short white run with a black run upon vertical scanning, an AND circuit 101 for logically ANDing the block image data stored in the block image memories 99 and 100 to obtain block image data, a block image memory 63 similar to the one shown in FIG. 7, and a label processing circuit 64 similar the one shown in FIG. 7.

In the image processing apparatus having the above-described arrangement, the short run detecting circuit 97 scans reduced image data stored in the reduced image memory 60 to detect a white run (short white run) having a predetermined value or less, and the white/black replacing circuit 98 reverses pixel values in the detected white run from "0"s (white pixels) to "1"s (black pixels). Block image data obtained by performing this scanning in the vertical and horizontal direction are respectively stored in the horizontal block image memory 99 and the vertical block image memory 100. The AND circuit 101 logically ANDs the respective block image data stored in the image memories 99 and 100 to create block image data. The block image data is then stored in the block image memory 63.

This operation will be described below with reference to FIG. 26.

Referring to FIG. 26, a partial image 102 is shown as an enlarged view of a portion of a reduced image corresponding to reduced image data stored in the reduced image memory 60, and one square represents one pixel. This partial image 102 is horizontally scanned to detect a white run having a length less than a length corresponding to, e.g., 16 pixels. The detected white run is replaced with a black run. The horizontal block image data obtained in this manner is stored in the horizontal block image memory 99.

A horizontal block image 103 corresponding to this horizontal block image data is an image of horizontal blocks corresponding to the partial image 102. The hatched portions of the horizontal block image 103 indicate the black runs which have replaced the white runs. Similarly, vertical block image data corresponding to a vertical block image 104 is obtained by vertically scanning the reduced image data and replacing short white runs with black runs. The vertical block image data is stored in the vertical block image memory 100.

The vertical block image 104 corresponding to the vertical block image data is an image of vertical blocks corresponding to the partial image 102. The hatched portions of the vertical block image 104 indicate the black runs which have replaced the white runs. The AND circuit 101 logically ANDs the respective block image data stored in the horizontal and vertical block image memories 99 and 100, and creates block image data. A block image 105 corresponding to this block image data is a block image corresponding to the AND of the respective block image data corresponding to the horizontal and vertical block images 103 and 104. The block image 105 corresponds to the partial image 102. The crosshatched portions of the block image 105 indicate the black pixels which have replaced the white pixels. Subsequently, image processing is performed in the sane manner as in the second embodiment, thus performing area division.

With this operation, area division can be performed without omitting end portions of image areas. In addition, since an image is cut into rectangular areas, a document image can be efficiently divided into areas.

In the image processing apparatus of the fifth embodiment, short white run/black run conversion is performed in block processing for integrating black pixels in a reduced image so that the black pixels in the reduced image can be integrated into substantially rectangular blocks. This allows efficient image area division.

The edge extraction/binarization sections 46, the image reducing sections 47, the block processing sections 48, and the rectangular area extracting sections 49 of the above-described image processing apparatuses are not limited to those in the second to fifth embodiments and may be formed by other known techniques. In addition, it is apparent that the combinations of these components are not limited those described above, and the respective processing sections may be exchanged with each other.

Note that when the direction or the like of a character string included in an image to be processed is known in advance, since pixels need to be integrated in only that direction, the above-described image processing apparatus can be realized by a simpler arrangement.

It is apparent that the image processing in the apparatus of these embodiments can be performed by software.

The arrangement of an image processing apparatus according to the sixth embodiment of the present invention will be described next with reference to FIG. 27.

This image processing apparatus is roughly constituted by a homogeneous image area extracting section 113 for dividing a digital image (composite image) into homogeneous image areas while all kinds of images are unknown, and a kind-of-image determining section 116 for determining the kinds of images of the divided homogeneous image areas.

In this image processing apparatus, a document file in which different kinds of images, e.g., typed characters, handwritten characters, photographs, and graphic patterns are written is imaged, as a full color image, by a video camera, an image scanner, or the like, and is input to, as an analog image input signal, to a digital image converter 111.

The digital image converter 111 converts the analog image input signal and outputs a digital image signal. The output data is input to and temporarily stored in an image frame memory 112. In addition, stored image data and transmitted image data which have already been converted into digital image signals are directly input to the image frame memory 112 to be temporarily stored, similar to the above-mentioned data.

The digital image data output from the image frame memory 112 is input to a homogeneous image area dividing section 114 constituting the homogeneous image area extracting section 113. The homogeneous image area dividing section 114 extracts the boundary between each area, in which homogeneous images are present, and a background, thus performing area division.

The homogeneous image area dividing section 114 outputs division area address data representing the horizontal and vertical positions of one corner calculated and determined as each rectangular area, and size (width and height) data of each rectangular area, with respect to a plurality of homogeneous image areas into which one composite image is divided. Various conventional methods may be used for division processing performed by the homogeneous image area dividing section 114.

For example, as described above in the respective embodiments, in order to reduce the processing load by reducing the amount of data to be handled, the homogeneous image area dividing section 114 converts the full color image data output from the image frame memory 112 into monochrome image data and binarizes the data. The homogeneous image area dividing section 114 then reduces the binary image data, performs edge extraction by filtering data with a low-pass filter, and binarizes the extracted edge image data. Furthermore, the homogeneous image area dividing section 114 performs line segment approximation with respect to the edge portions of the binary edge image in the horizontal and vertical directions, thus extracting the boundaries of rectangles. With this operation, homogeneous image areas can be obtained.

The divided area address data and the size data output from the homogeneous image area dividing section 114 are input to a search block selecting section 115. The search block selecting section 115 selects a specific portion of an obtained homogeneous image area as a target area used for actual kind-of-image determination. Assume that a target area selected by the search block selecting section 115 is a preset area or a small rectangular block area having a predetermined size which adaptively changes in accordance with the size of a homogeneous image area.

FIG. 28 is a simplified illustration of a composite image which has undergone such division processing. In the image shown in FIG. 28, eight homogeneous image areas A to I are present. For example, a small rectangular (determination target) block is set in the homogeneous image area H and is moved within the area to perform the subsequent determination processing, thus specifying the kind of image of the homogeneous image area H. This small rectangular block is a determination target block which is actually used to determine the kind of image in the processing to be described later. The size of the target block is smaller than at least that of the homogeneous image area.

A determination target block is selected a plurality of times in a homogeneous image area by the search block selecting section 115 in such a manner that the positions of selected target blocks do not coincide with each other. The position and size data of a selected determination target block are input to the image frame memory 112. Image data of a corresponding image memory portion is then output from the image frame memory 112.

The full color image data of the determination target block output from the image frame memory 112 is input to a determination target block image memory 117 constituting the kind-of-image determining section 116 and is temporarily stored in the memory 117. The full color image data output from the determination target block image memory 117 is input to a monochrome image converting section 118 and is converted into monochrome image data consisting of luminance level data.

This embodiment assumes that the kind of image is determined by only the luminance information of the image without using color information. One reason for such processing is to reduce the calculation processing load by minimizing the amount of data processed at the initial stage in the overall process, thereby realizing processing with higher practicability. Another reason is to realize highly versatile processing that allows proper determination of the kind of image regardless of whether all or part of an input image is a monochrome image.

The monochrome image data of the determination target image output from the monochrome image converting section 118 is input to horizontal and vertical difference detectors 119 and 120 at once, and output data therefrom are respectively input to buffer memories 121 and 122 to be temporally stored therein. The horizontal difference detector 119 calculates the difference in luminance level between an arbitrary pixel and a neighboring pixel, in the horizontal direction, in the image data constituted by the luminance components of the respective pixels of the determination target area output from the monochrome image converting section 118.

More specifically, if the monochrome image of the determination target image is a rectangular image consisting of M×N pixels, and horizontal and vertical pixel arrays are respectively described as i and j, as shown in FIG. 29A, the luminance level of an arbitrary pixel is expressed by $$Y_{ij} \quad (1)$$

where i, j: 0, 1, 2, . . . , M−1.

A horizontal difference value $\Delta h_{ij}$ is expressed by $$\Delta h_{ij} = Y_{(i+1)j} - Y_{ij} \quad (2)$$

where i, j: 0, 1, 2, . . . , M−2.

Similarly, a vertical difference value $\Delta v_{ij}$ is expressed by $$\Delta v_{ij} = Y_{i(j+1)} - Y_{ij} \quad (3)$$

where i, j: 0, 1, 2, . . . , N−2.

The horizontal and vertical difference maps constituted by these calculated horizontal and vertical difference values are respectively stored in the buffer memories 121 and 122, and are also input to a luminance modification parameter calculating section 123 to calculate parameters for modifying luminances.

In the luminance modification parameter calculating section 123, processing is performed in accordance with the flow chart shown in FIG. 29B. The average of the difference data of portions, of the horizontal difference map, from which steep edge portions are removed is calculated as an average horizontal difference avr$\Delta$h (steps S1 to S3), and the average of the difference data of portions, of the vertical difference map, from which steep edge portions are removed is calculated as an average vertical difference avr$\Delta$v (steps S4 to S6).

As shown in FIG. 29C, a plane vector p (h,v,d) defined by a vector $\underline{h}$ (1,0,avr$\Delta$h) and a vector $\underline{v}$ (0,1,avr$\Delta$v) in a three-dimensional orthogonal space (H,V,D) of a horizontal direction (H), a vertical direction (V), and a difference value (D) in a determination target image is expressed by the following equation:

$$\text{plane vector } p = \alpha \times \text{vector } h + \beta \times \text{vector } v \quad (4)$$

A normal vector $\underline{n}$ with respect to this plane vector p (h,v,d) is obtained from $$\text{normal vector } n - (avr\Delta h, avr\Delta v, -1) \quad (5)$$

A bit map obtained by setting "0"s in the steep edge portions and "1"s in the remaining portion on the horizontal difference map, and a bit map obtained by setting "0"s in the steep edge portions and "1"s in the remaining portion on the vertical difference map are formed in the above-described processing. A bit map obtained by logically ORing these two bit maps (step S7 in FIG. 29B) is used as a mask pattern. Note that a steep edge is determined depending on whether the absolute value of a difference value is larger than a predetermined threshold value. In this manner, the above-mentioned normal vector $\underline{n}$ and mask pattern are output, as luminance modification parameters, from the luminance modification parameter calculating section 123.

Figure 31A:
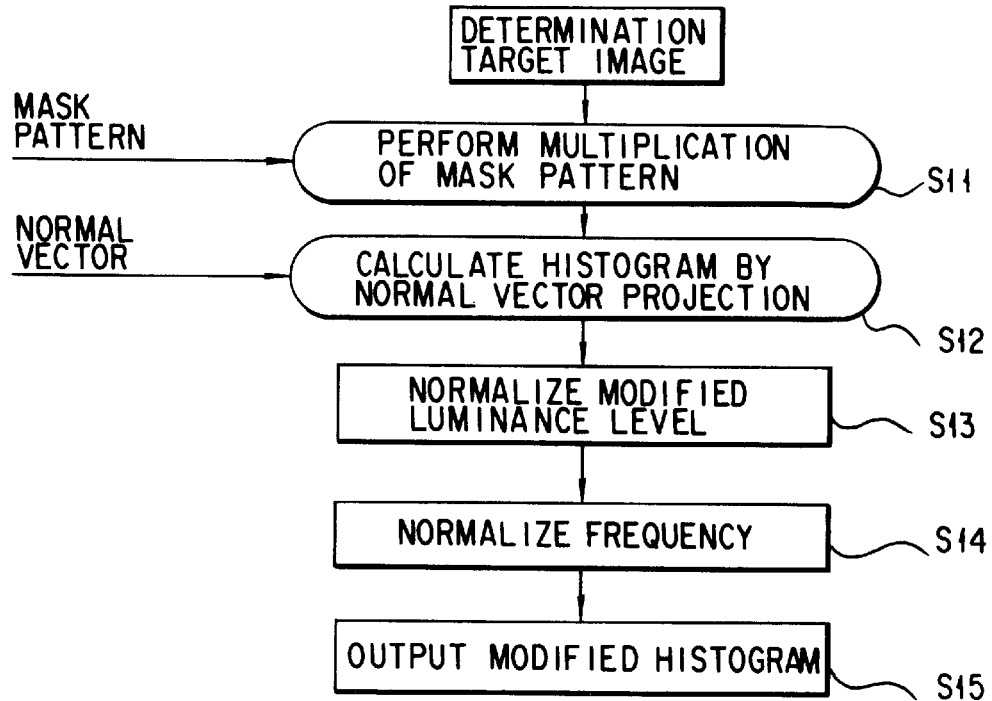
FIGS. 31A and 31B are views for explaining a method of calculating a modified luminance histogram in the sixth embodiment.

The data of the normal vector $\underline{n}$ and the mask pattern output from the luminance modification parameter calculating section 123 are input to a luminance level modifying section 124 to correct the luminance data of the determination target block which is simultaneously input from the monochrome image converting section 118. Luminance level modification processing is performed by the luminance level modifying section 124 in accordance with the flow chart shown in FIG. 31A as follows.

Figure 31B:
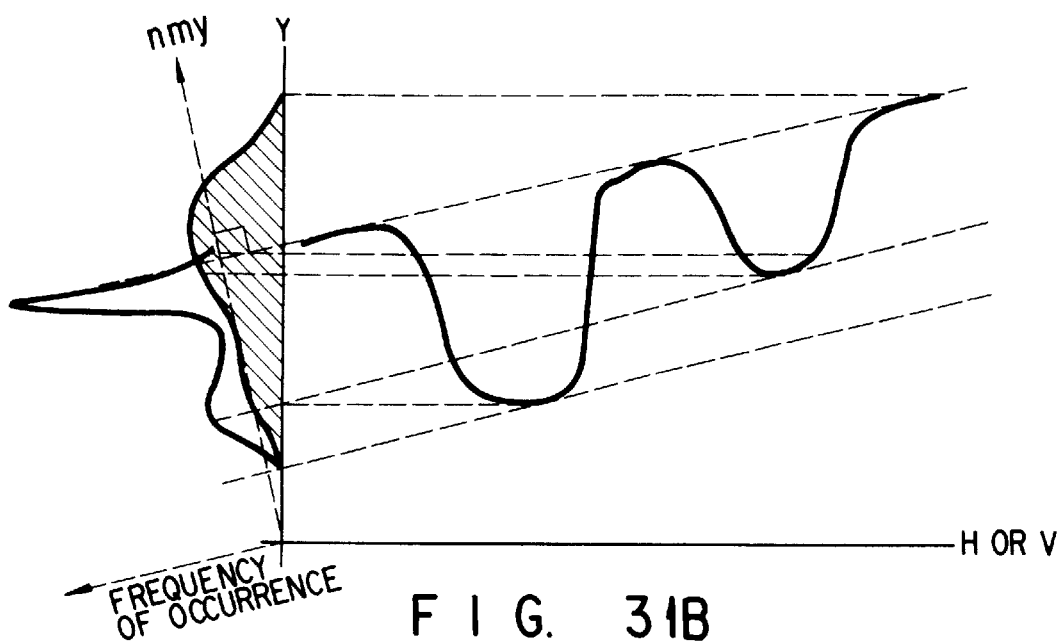

First, the luminance level image data from the monochrome image converting section 118 is multiplied by the mask pattern obtained in advance to remove steep edge portions from the luminance data (step S11). In the three-dimensional orthogonal space (H,V,Y) of the horizontal direction, vertical direction, and luminance of the determination target block shown in FIG. 31B, a coordinate axis coinciding with the direction of the obtained normal vector $\underline{n}$ is set as a modification coordinate axis mY, modified luminance levels $my_{ij}$ are calculated by projecting luminance levels $y_{ij}$ of all the pixels in a block, and a frequency is obtained for each modified luminance level, thus calculating and outputting a modified luminance histogram (steps S12 and S15). The modified luminance histogram is normalized with respect to the modified luminances (steps S13 and S14).

Various normalization methods can be considered. For example, a modification luminance histogram is expressed by $$f(my) \quad (6)$$

for my=0 to 255
and the integrated frequency in an arbitrary modified luminance $my_{ij}$ obtained by integrating modified luminances from 0 to the maximum value is expressed by g(my). The integrated frequency g(my) can be expressed by $$g(my) = \sum_{x=0}^{my} f(x)$$

Let $g_t$ be the sum frequency of the histogram. In normalizing the modified luminances, if a modified luminance level my which satisfies $g(my)/g_t = 5\%$ is given as a minimum modified luminance level min__my, and a modified luminance level my which satisfies $g(my)/g_t = 95\%$ is given as a maximum modified luminance level max__my, normalized modified luminance levels can be obtained on the basis of the arbitrary modified luminance levels $my_{ij}$ according to the following equation]

$$nr = 255/(\text{max\_may} - \text{min\_my})$$

[normalized modified level $nmy_{ij}$] = $(my_{ij} - \text{min\_may}) \cdot nr$

This processing is normalization processing of obtaining the luminance level range of the histogram of modified luminance levels, and linearly converting the obtained luminance level range into a predetermined fixed range. Note that when minimum and maximum modified luminance levels are determined, the ratio of the integrated frequency of a histogram to the sum frequency is not limited to the above-mentioned examples, i.e., 5% and 95%, and a proper value may be set.

With the above-described processing, in the luminance level modifying section 124, the luminance level $my_{ij}$ of an arbitrary pixel (i,j) of the determination target block from the monochrome image converting section 118 is modified and normalized to be obtained as a normalized modified luminance level $nmy_{ij}$.

A series of luminance modifying operations are performed by the luminance correction parameter calculating section 123 and the luminance level modifying section 124 to reduce irregularity of low-frequency illumination acting on a determination target block and to reduce the dependency of the difference in dynamic range between the images of the respective blocks on the distribution shape of the histogram. This processing can be performed without performing convolution processing and hence is simpler than the processing using a high-pass filter for removing low-frequency components. The above-mentioned calculated normalized modified luminance level $nmy_{ij}$ is output from the luminance level correcting section 124.

Referring to FIG. 27, the three feature parameters, i.e., the horizontal difference value $\Delta h_{ij}$ output from the buffer memory 121, the vertical difference value $\Delta v_{ij}$ output from the buffer memory 122, and the normalized modified luminance level $nmy_{ij}$, are input to the vector quantizer 125 to perform vector quantization with respect to feature vectors $f(\Delta h, \Delta v, nmy)$ in a new three-dimensional space $(\Delta H, \Delta V, nmY)$ defined on the basis of these feature parameters as components.

Figure 30A:
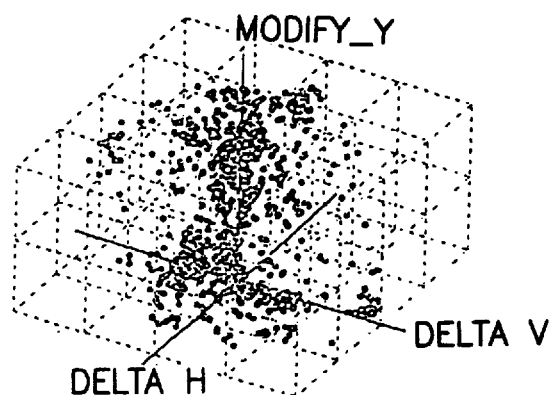
FIGS. 30A, 30B, 30C, and 30D are views showing distributions of feature vectors for all the kinds of images.
Figure 30B:
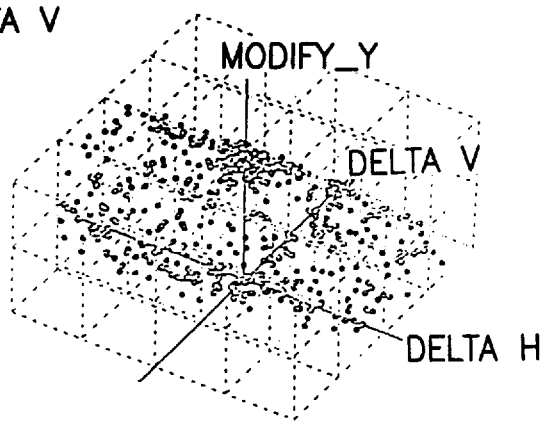
Figure 30C:
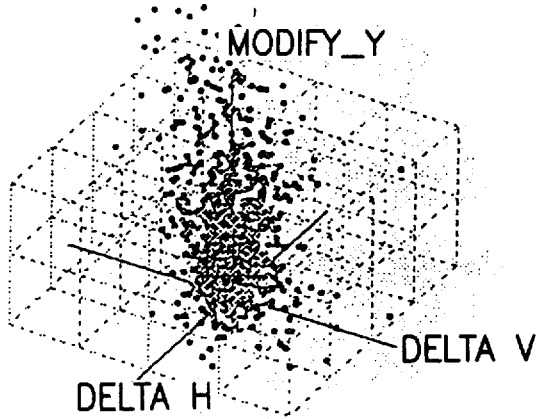
Figure 30D:
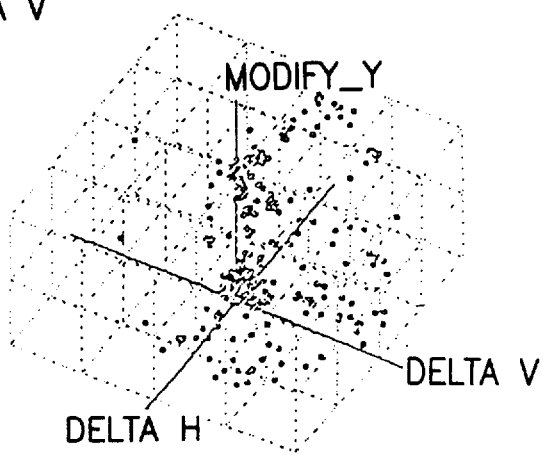

FIGS. 30A to 30D respectively show the distributions of feature vectors generated for all the kinds of images. FIG. 30A shows feature vectors of typed characters; FIG. 30B, feature vectors of handwritten characters; FIG. 30C, feature vectors of a photographic image; and FIG. 30D, feature vectors of a graphic pattern image. In each of these drawings, the distribution of feature vectors is plotted in a three-dimensional orthogonal space in which the ordinate represents the modified luminance nmY (modify Y) and the abscissa represents the vertical difference value $\Delta V$ (delta V) and the horizontal difference value $\Delta H$ (delta H). It is apparent from these drawings that the kinds of images can be discriminated in accordance with the differences between feature vectors.

Feature vectors $f_{ij}$ ($\Delta h_{ij}, \Delta v_{ij}, nmy_{ij}$) for all arbitrary pixels (i,j) in the determination target block are input to the vector quantizer 125 and are processed. Quantized vectors to be output from the vector quantizer 125 are obtained from a generation distribution obtained by calculating the above-mentioned feature parameters from a plurality of determination target block images having a plurality of the kinds of images and plotted in the three-dimensional orthogonal space ($\Delta h, \Delta v, nmy$). That is, a generation distribution is optimally divided into a predetermined number of local spaces, and the probabilities of occurrence of feature vectors in the respective local spaces are set to be equal to each other. Under this condition, average vectors in the respective local areas are set to be representative vectors. These representative vectors are quantized vectors.

Various methods are available as methods of calculating representative vectors. When, for example, the LBG algorithm ("An Algorithm for Vector Quantizer Design" YOSEPH LINDE etc. IEEE TRANSACTION ON COMMUNICATIONS, VOL. COM-28, NO. 1 JANUARY 1980) is used, representative vectors are determined such that the Euclidean distances between all the feature vectors in a local area and the representative vectors in the local area becomes shortest with respect to the Euclidean distances from the representative vectors in another local area.

In the execution of vector quantization by a regular method, when arbitrary feature vectors are input to the vector quantizer 125, Euclidean distances from a predetermined number of representative vectors obtained in advance are measured, as described above, and a vector having the minimum distance is selected. This selected representative vector is output as a quantized vector of the input feature vectors.

If vector quantization is performed by a regular method in this manner, the calculation processing load is generally increased.

For this reason, this embodiment uses a vector quantizer based on a hierarchical feed-forward neural network.

FIG. 32 shows the arrangement of this neural network. The feature vectors $f_{ij}$ ($\Delta h_{ij}, \Delta v_{ij}, nmy_{ij}$) are input from an input section 131 to a neural network 132. In a learning operation, the feature vectors are also input to a Euclidean distance calculating section 133 at the same time. The neural network 132 is a feed-forward hierarchical network and is constituted by a three-input layer 134, an intermediate layer 135 having a predetermined number of layers and neuro elements, and an output layer 136 having K outputs.

Outputs from the output layer 136 are output to an output section 137. In this case, "K" is a vector count which is set in advance by a trial-and-error method and coincides with the number of representative vectors described above. Learning of the neural network 132 constituting the vector quantizer is performed by using a teacher data creating section 138. In the teacher data creating section 138, the data of representative vectors $f_k$ [k=0, 1, ..., K] obtained by the above-described method in advance, which vectors are output from a representative vector data memory 139, and feature vectors output from the input section 131, are input to the Euclidean distance calculating section 133, and distances $f_k$ between an arbitrary feature vector and all the representative vectors are calculated by the above-mentioned regular method.

A representative vector $f_k$ with the minimum distance is selected by a minimum distance selecting section 140 and is input to the output section 137. The teacher data creating section 138 then issues an instruction to fire one of output branches corresponding to the K representative vectors $f_k$. For example, an output to be fired is set to "1", and the remaining outputs are set to "0". This represents quantized vectors exhibiting one-to-one correspondence with the feature vectors input to the neural network 132.

Such a learning sequence is performed by a known back propagation method, in which a plurality of feature vectors are selected from a composite image without specifying the kinds of images in the composite image. This processing is repeated until the difference between outputs becomes a present value or less. When learning of the neural network 132 is completed, and all weights are determined, the teacher data creating section 138 is disconnected from the neural network 132. That is, the neural network 132 has the function of a vector quantizer for receiving feature vectors as inputs and outputting corresponding quantized vectors.

With the vector quantizer 125 having such an arrangement, the calculation amount is reduced to realize high-speed processing. Note that if a neural network is used, the number of outputs with respect to input feature vectors may not be limited to one. In this case, a plurality of quantized vectors as outputs are allowed, and are treated as quantized vector candidates.

A single quantized vector or a plurality of quantized vector candidates output from the vector quantizer 125 are input to a quantized vector counting section 126. The quantized vector counting section 126 counts the frequency of occurrence of each quantized vector $f_k$ and generates a histogram of the quantized vectors $f_k$. As is apparent, the sum frequency coincides with the planned number of pixels of the determination target block. The frequency of the quantized vector histogram is normalized such that the maximum frequency of the quantized vectors $f_k$ becomes a predetermined value, in order to maintain versatility with respect to a change in pixel count of a determination target block to be treated.

The histogram of the quantized vectors $f_k$ is input to a feature pattern determining section 127, which checks the shape of the histogram and outputs determined kind-of-image data. The feature pattern determining section 127 is constituted by a feed forward hierarchical type neural network, in which the input layer has K inputs coinciding with the number of quantized vectors, the intermediate layer has layers, the number of which is optimally determined by a trial-and-error method, and neuron elements, and the output layer has outputs corresponding to the number of the kinds of images to be determined. If, for example, five kinds of images, i.e., a typed character, a handwritten character, a photograph, a graphic pattern image, and a background image, are to be determined and separated from a composite image, the output layer has five outputs.

In learning of the neural network of the feature pattern determining section 127, the data indicating the kinds of image of a determination target block selected by a search block selecting section 145 corresponding to the pattern shape of the histogram of input quantized vectors is supplied, as teacher data, to the output layer. In the learning operation, the kind-of-image data of the determination target block as the teacher data is manually recognized and determined. The learning sequence is repeated while the kind of determination target image is variously changed, until an output error is reduced to a preset error or less, according to the back propagation method. The feature pattern determining section 127 performs recognition processing by using the neural network on the basis of the fact that the shape (feature pattern) of the histogram of input quantized vectors correlates with the kind of image. The neural network is used to avoid an enormous amount of calculations for comparison/determination with respect to a large amount of reference templates, as in a general pattern matching method. In addition, the neural network is used because a slight deterioration in the correlation between a feature pattern and an image type has a small influence on the probability of determination. Upon completion of learning, the feature pattern determining section 127 serves as a kind-of-image determining unit for determining the kind of image with respect to the histogram shape of already input quantized vectors, and outputting data indicating the determined kind of image.

The output from the feature pattern determining section 127 is input to a kind-of-image determining section 128, and final determination of the kind of image of the determination target block. Similar to the vector quantizer 125 described above, the neural network outputs of the feature pattern determining section 127 may not output even one kind-of-image data. Therefore, a criterion for estimating determination results is required, and determination processing is required.

In this embodiment, for example, in the arrangement shown in FIG. 33, when input data are input as data $I_1$, $I_2$, ..., $I_5$ in correspondence with the five kinds of images, a determined kind-of-image determining section 141 determines whether to hold or perform determination of the kind of image. If $$I_i > th_1 \text{ (where } i=1, 2, \ldots, 5)$$

and (the maximum value of $I_i$)–(the second largest value of $I_i$)>$th_2$, then the flow of processing advances to a determined kind-of-image data output section 142, and the kind of image max($I_i$) indicating the maximum value of $I_i$ is a determined kind of image. Otherwise, the flow of processing is shifted to a determination holding section 143 to hold determination of the kind of image. Note that $th_1$ and $th_2$ are predetermined threshold values which are statistically set in advance such that the error probability of the kind of image finally determined in the embodiment with respect to a desired kind of image manually set. The determined arbitrary determination target block kind-of-image determination result is input to a determination result storage section 144 to be temporarily stored therein. The flow then returns to the search block selecting section 115. A different determination target block is then selected within the homogeneous image area, and the processing sequence to the determination result storage section 144 is repeated a plurality of times. Consequently, the determination results of different determination target blocks in the homogeneous image area are stored in the determination result storage section 144. A predetermined number of determination results in the determination result storage section 144 are input to a majority decision section 145 to be subjected to decision of majority. Thereafter, the kind-of-image determining section 128 outputs the final determination of the kind of image of the corresponding homogeneous image area.

The finally determined kind-of-image data output from the kind-of-image determining section 128 and the address data and size data of the homogeneous image area are output from the image processing apparatus of the embodiment as a composite image area dividing apparatus.

Figure 34:
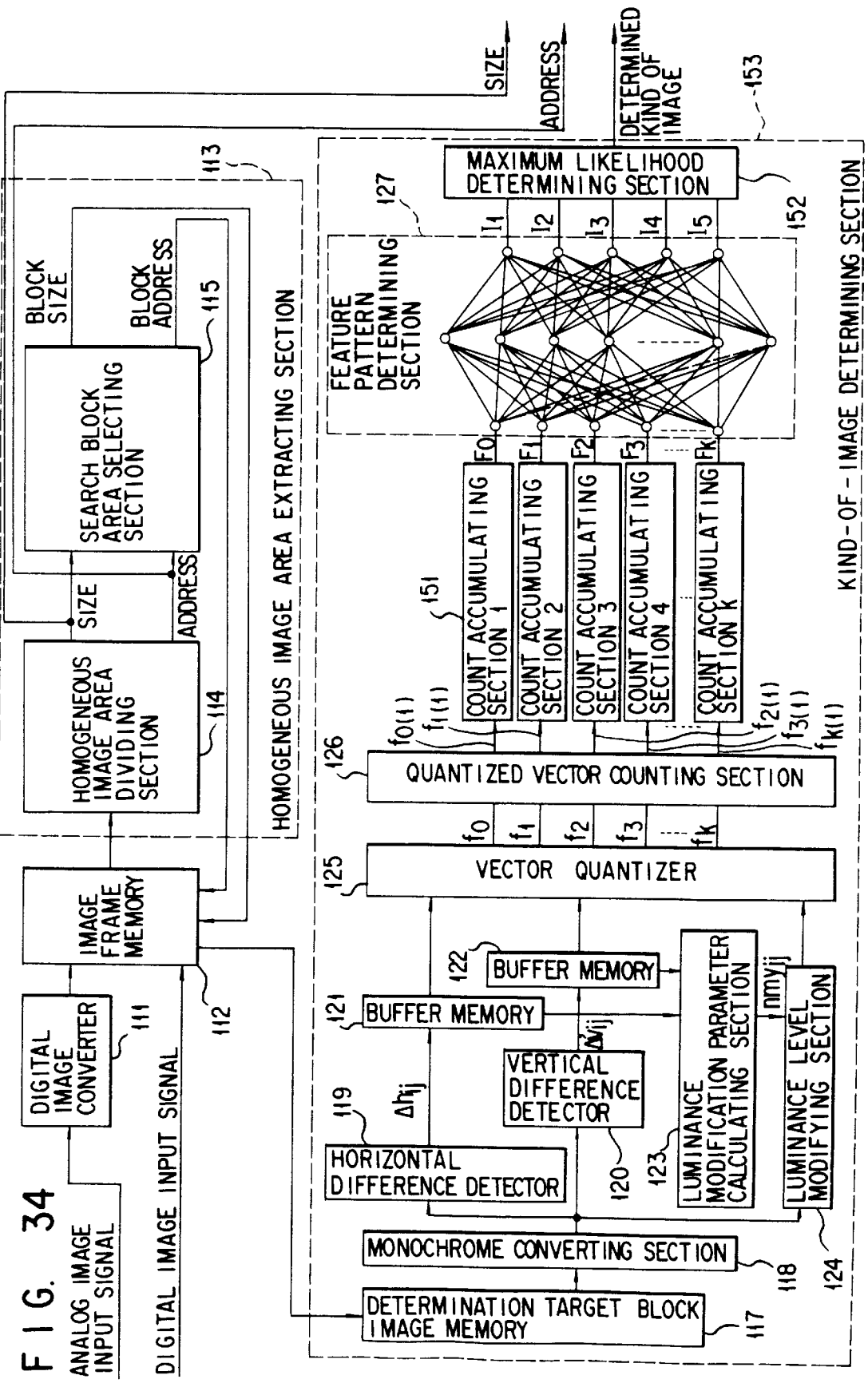
FIG. 34 is a block diagram showing an arrangement for explaining kind-of-image determination by using a plurality of determination target areas.

The arrangement of an image processing apparatus according to the seventh embodiment of the present invention will be described next with reference to FIG. 34. The same reference numerals in the seventh embodiment in FIG. 34 denote the same parts as in the sixth embodiment in FIG. 27, and a description thereof will be omitted. That is, the seventh embodiment has the same arrangement as that of the sixth embodiment except for the arrangement of components arranged on the output side of the quantized vector counting section 126.

As in the sixth embodiment described above, the quantized vector counting section 126 performs vector quantization with respect to feature vectors for an arbitrary determination target block in an arbitrary homogeneous image area, normalizes the frequency of the corresponding histogram, and outputs the normalized data. If determination target blocks, in an arbitrary homogeneous image area, selected by the search block selecting section 115 are numbered in the order of selection to be identified, the normalized quantized vectors can be expressed as quantized vectors $f_k$ [L]

for k=0, 1, ..., K and L=0, 1, ..., L, where K is the number of vectors to be quantized, and L is the total number of determination target blocks to be selected. In other words, L is the number of times of search in an arbitrary homogeneous image area in units of determination target blocks. Quantized vectors $f_k$ [L] output from a quantized vector counting section 151 are respectively input to K count accumulating sections 1 to K connected thereto to be accumulated L times. As a result, vectors $F_k$ are output. More specifically, $$\text{vectors } F_k = \sum_{l_0}^{L} \text{vectors } f_k [l]$$

are output. Note that if the number of times of search is to be variously changed, in order to prevent vectors $F_k$ from depending on L, each vector $F_k$ may be divided by L to set the frequency of an output histogram as an average.

When the histogram of quantized vectors is to be obtained from the accumulated frequency of a plurality of determination target blocks in an arbitrary homogeneous image area, a processing sequence from the search block selecting section 115 to a count accumulating section 151 must be repeated a predetermined number of times (L).

The vectors $F_k$ output a number of times corresponding to the number of times of search are input to the feature pattern determining section 127 having the same arrangement as that in the sixth embodiment, and signals corresponding to the kinds of images to be identified, e.g., signals $I_1$ to $I_5$, are output.

The output kind-of-image signal $I_1$ to $I_5$ are input to a maximum likelihood determining section 152, and the kind of image exhibiting the maximum value is output as a maximum likelihood determination image. In this embodiment, determination of the kind or image is not held.

Kind-of-image data output from the maximum likelihood determining section 152 and the address data and size data of the homogeneous image area, similar to that in the sixth embodiment, are output, as final outputs from the composite image area dividing apparatus of the embodiment, from the maximum likelihood determining section 152.

If the arrangement and kind-of-image determination sequence of the seventh embodiment are realized, the pattern of the histogram of quantized vectors corresponding to the kinds of images provides an effect of enlarging a search area in a homogeneous image area, thus allowing a large population for feature extraction. In addition, in spite of the enlargement of a search area, determination processing need not be performed for each block.

The arrangement of an image processing apparatus as the eighth embodiment of the present invention will be described next with reference to FIG. 3E. The same reference numerals in the eighth embodiment in FIG. 35 denote the same parts as in FIG. 27, and a description thereof will be omitted.

In this image processing apparatus, a document film in which different kinds of images, e.g., typed characters, handwritten characters, photographs, and graphic patterns, are written is imaged. as a full color image, by a video camera or an image scanner (not shown). This full color image is input, as an analog image input signal, to a digital image converter 111.

The digital image converter 111 converts the analog image input signal into a digital image signal and outputs the signal as digital image data. This output image data is input to an image frame memory 112 and is temporarily stored therein. In addition, stored image data and transmitted image data which have already been converted into digital image signals are directly input to the image frame memory 112 and are also temporarily stored.

The digital image data output from the image frame memory 112 is input to a homogeneous image area dividing section 114 constituting a homogeneous image area extracting section 113. The homogeneous image area dividing section 114 extracts the boundaries between the boundary between each area, in which images of the same type are present, and a background, thus performing area division. A plurality of homogeneous image areas divided from one composite image are calculated as rectangular areas, respectively, and division area address data indicating the horizontal and vertical positions of a predetermined corner of each rectangular area and the size data (width and height) of each rectangular area are output. In this case, division processing is performed in the same manner as in the homogeneous image area dividing section 114 shown in FIG. 27.

The division area address data and the size data output from the homogeneous image area dividing section 114 are input to a search block selecting section 115. The search block selecting section 115 selects a specific portion of an obtained homogeneous image area as a target area actually used for determination of the kind of image. Assume that the target area is a preset area or a small rectangular block area having a predetermined size which adaptively changes in accordance with the size of a homogeneous image area.

A determination target block is selected a plurality of times in a homogeneous image area by the search block selecting section 115 in such a manner that the positions of selected target blocks do not coincide with each other. The position and size date of a selected determination target block are input to the image frame memory 112. Image data of a corresponding image memory portion is then output from the image frame memory 112.

The full color image data of the determination target block output from the image frame memory 112 is input to a determination target block image memory 117 constituting a kind-of-image determining section 116 and is temporarily stored in the memory 117. The full color image data output from the determination target block image memory 117 is input to a monochrome image converting section 118 and is converted into monochrome image data consisting of luminance level data.

The monochrome image data of the determination target image output from the monochrome image converting section 118 is first input to a horizontal difference detector 119 and a vertical difference detector 120 at once, and output data $\Delta j_{ij}$ and $\Delta v_{ij}$ with respect to an arbitrary pixel (i,j) of the determination target block are sequentially input to buffer memories 121 and 122, respectively, and are temporarily stored therein. The horizontal difference detector 119 calculates the difference in luminance level between an arbitrary pixel and a neighboring pixel, in the horizontal direction, in the image data constituted by the luminance components of the respective pixels of the determination target area output from the monochrome image converting section 118.

The horizontal and vertical difference maps constituted by these calculated horizontal and vertical difference values are respectively stored in the buffer memories 121 and 122, and are also input to a luminance modification parameter calculating section 123 to calculate parameters, a normal vector $\underline{n}$, and a mask pattern for modifying luminances.

The data of the normal vector $\underline{n}$ and the mask pattern output from the luminance modification parameter calculating section 123 are input to a luminance level modifying section 154 to modify the luminance data of the determination target block which is simultaneously input from the monochrome image converting section 118. In luminance level modification processing performed by the luminance level modifying section 154, a luminance level $my_{ij}$ of an arbitrary pixel (i,j) of the determination target block output from the monochrome image converting section 118 is modified and normalized to be output as a normalized modified luminance level $nmy_{ij}$.

The normalized modified luminance level $nmy_{ij}$ is then input to a modified luminance histogram calculating section 155. The modified luminance histogram calculating section 155 counts the frequency of the normalized modified luminance level $nmy_{ij}$ to form a histogram. This histogram is generated by linearly dividing the difference between the maximum and minimum values of normalized modified luminance levels by a predetermined count S, with the minimum division unit being set as the step width of frequency counting.

Therefore, an output count from the modified luminance histogram calculating section 155 is provided as a step count S. This step count S is obtained as a minimum count in advance in a trial-and-error manner such that the correlation between the kind of image and a histogram is properly maintained. In this case, an output from the modified luminance histogram calculating section 155 is defined as $Y_s$ (for s=0, 1, . . . , S)

A horizontal difference value $h_{ij}$ and a vertical difference value $v_{ij}$ temporarily stored in the buffer memories 121 and 122 are simultaneously read out and input to a gradient vector azimuth detecting section 156. The gradient vector azimuth detecting section 156 obtains gradient vector azimuths according to the following equations:

when $h_{ij}>0$, then $\theta=\tan^{-1}(\Delta v_{ij}/\Delta h_{ij})$ (1)

when $h_{ij}<0$, then $\theta=\tan^{-1}(\Delta v_{ij}/\Delta h_{ij})+\pi$ (2)

where θ is the gradient vector azimuth corresponding to an arbitrary pixel (i,j) of the determination target block.

The gradient vector azimuth θ is input to a gradient vector azimuth histogram calculating section 157. The gradient vector azimuth histogram calculating section 157 then counts the frequency of the gradient vector azimuth θ and generates a histogram. Similar to the operation of obtaining the modified luminance histogram, this histogram is obtained by linearly dividing the difference between the maximum and minimum values of gradient vector azimuths uniformly by a predetermined count R at a predetermined step angle, with an azimuth angle belonging to the minimum division unit being set as the unit of frequency counting.

Therefore, an output count from the gradient vector azimuth histogram calculating section 157 is provided as the count R. This step count R is obtained as a minimum count in advance in a trial-and-error manner such that the correlation between the kind of image and a histogram is properly maintained. In this case, an output from the gradient vector azimuth histogram calculating section 157 is defined as $\theta_r$ (for r=0, 1, . . . , R)

Note that in order to prevent the histogram shape of the gradient vector azimuths θ from losing versatility even if the total counted frequencies differ, normalization is preferably performed at the maximum frequency $\theta_r$, as needed.

With the above-described operation, a total of [R+S] outputs $y_s$ and $\theta_r$ from the modified luminance histogram calculating section 155 and the gradient vector azimuth histogram calculating section 157 are input to the feature pattern determining section 127. The feature pattern determining section 127 is constituted by a hierarchical neural network, in which the input layer has [R+S] inputs, the intermediate layer has layers, the number of which is optimally determined by a trial-and-error method, and neuron elements, and the output layer has outputs corresponding to the number of the kinds of images to be determined. If, for example, five kinds of images, i.e., a typed character, a hand-written character, a photograph, a graphic pattern image, and a background image, are to be determined and separated from a composite image, the output layer has five outputs.

In neural network learning of the feature pattern determining section 127, data indicating the kind of image of a determination target block selected by the search block selecting section 115 and correlating with an input modified luminance histogram $y_s$ and an input gradient vector azimuth histogram $\theta_r$ is supplied, as teacher data, to the input layer. In the learning operation, the kind-of-image data of the determination target block as the teacher data is manually recognized and determined. The learning sequence is repeated while the kind of determination target image is variously changed, until an output error is reduced to a preset error or less, according to the back propagation method. The feature pattern determining section 127 performs recognition processing by using the neural network on the basis of the fact that the shapes (feature patterns) of the modified luminance histogram $y_s$ and the gradient vector azimuth histogram $\theta_r$ correlate with the kind of image. Similar to the second embodiment, the neural network is used to avoid an enormous amount of calculations for comparison/determination with respect to a large amount of reference templates, as in a general pattern matching method. In addition, the neural network is used because a slight deterioration in the correlation between feature patterns and the kind of image has a small influence on the probability of determination. Upon completion of learning, the feature pattern determining section 127 serves as a kind-of-image determining unit for determining the kind of image with respect to the histogram shapes of the modified luminance histogram $y_s$ and the gradient vector azimuth histogram $\theta_r$ which have already been input.

In this embodiment, the following features are obtained and used as features indicating the correlation between the kind of image and the histogram shapes of the modified luminance histogram $y_s$ and the gradient vector azimuth histogram $\theta_r$.

FIGS. 36A, 36B, 36C, 37A, 37B, and 37C respectively show the characteristic patterns of histogram shapes, taking a typed character image, a photographic image, and a graphic pattern image as examples. FIGS. 36A, 36B, and 36C show modified luminance histograms, in which modified luminances are plotted along the abscissa, and frequencies of occurrence (probabilities of occurrence) are plotted along the ordinate. FIGS. 37A, 37B, and 37C show frequencies, counted for every azimuth angle of 15° and at a corresponding step angle, in the azimuth direction. With regard to the typed character image, the luminance level distribution has high and low localized levels, exhibiting bimodality, and direction dependence can be observed from the gradient vector azimuth distribution, in which frequencies conspicuously increase every 90°. With regard to the photographic image, the luminance level distribution exhibits unimodality, and the gradient vector azimuth distribution exhibits no special direction dependency. With regard to the graphic pattern image, the frequency distribution of luminance levels exhibits multi-modality, and the gradient vector azimuth distribution exhibits direction dependency, in which frequencies conspicuously increase every 45° well as 90° as in the case of the typed character image. In this manner, a modified luminance histogram and a gradient vector azimuth histogram exhibit a combination of characteristic patterns in accordance with an image type.

Figures 38, 40:
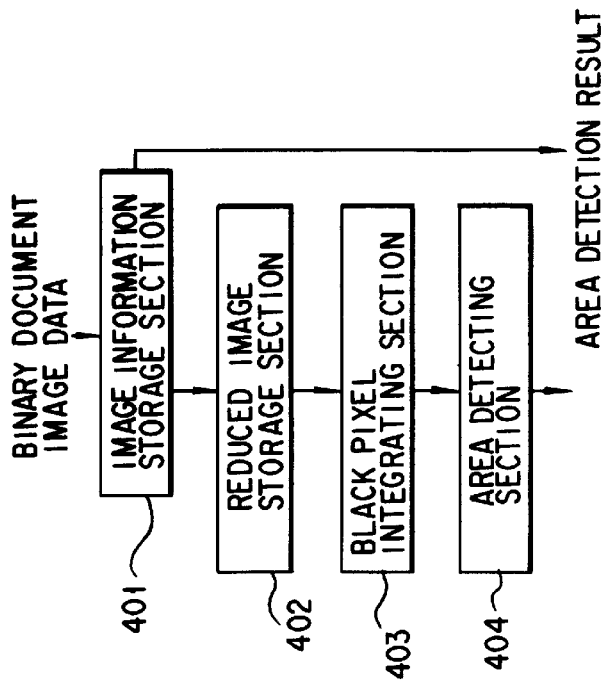
FIG. 38 is a table showing typical feature patterns discriminated from each other by gradient vector azimuths and modified luminance levels.
FIG. 40 is a block diagram showing a schematic arrangement of a conventional image processing apparatus.

FIG. 38 shows a summary of features associated with the kinds of images and indicated by two parameters. With regard to a handwritten character image, the luminance histogram indicates bimodality, and the gradient vector histogram indicates that the image has no direction dependency. With regard to a background image, the luminance level distribution indicates acute unimodality. In order to prevent a recognition error with respect to the unimodality exhibited by a typed character image, a distribution frequency is set to be zero when a corresponding occupation level range is below a threshold value. In this case, all the frequencies of modified luminance levels are set to be zero, and hence the gradient vector azimuth histogram exhibits no direction dependency.

In addition, since the possible level range of the luminance level distribution of a background image is smaller than that of a typed character image, the difference in luminance level distribution can be clarified by determination processing based on a threshold value.

Subsequently, the output from the feature pattern determining section 127 is input to the kind-of-image determining section 128, thus performing final determination of the kind of image of the determination target block. The neural network output of the feature pattern determining section 127 may not output data indicating one kind of image. For this reason, the kind of image is determined by the processing shown in FIG. 32.

The data of the finally determined kind of image output from the kind-of-image determining section 128 and the address data and size data of this corresponding homogeneous image area are output from the composite image area dividing apparatus of the embodiment.

Figure 35:
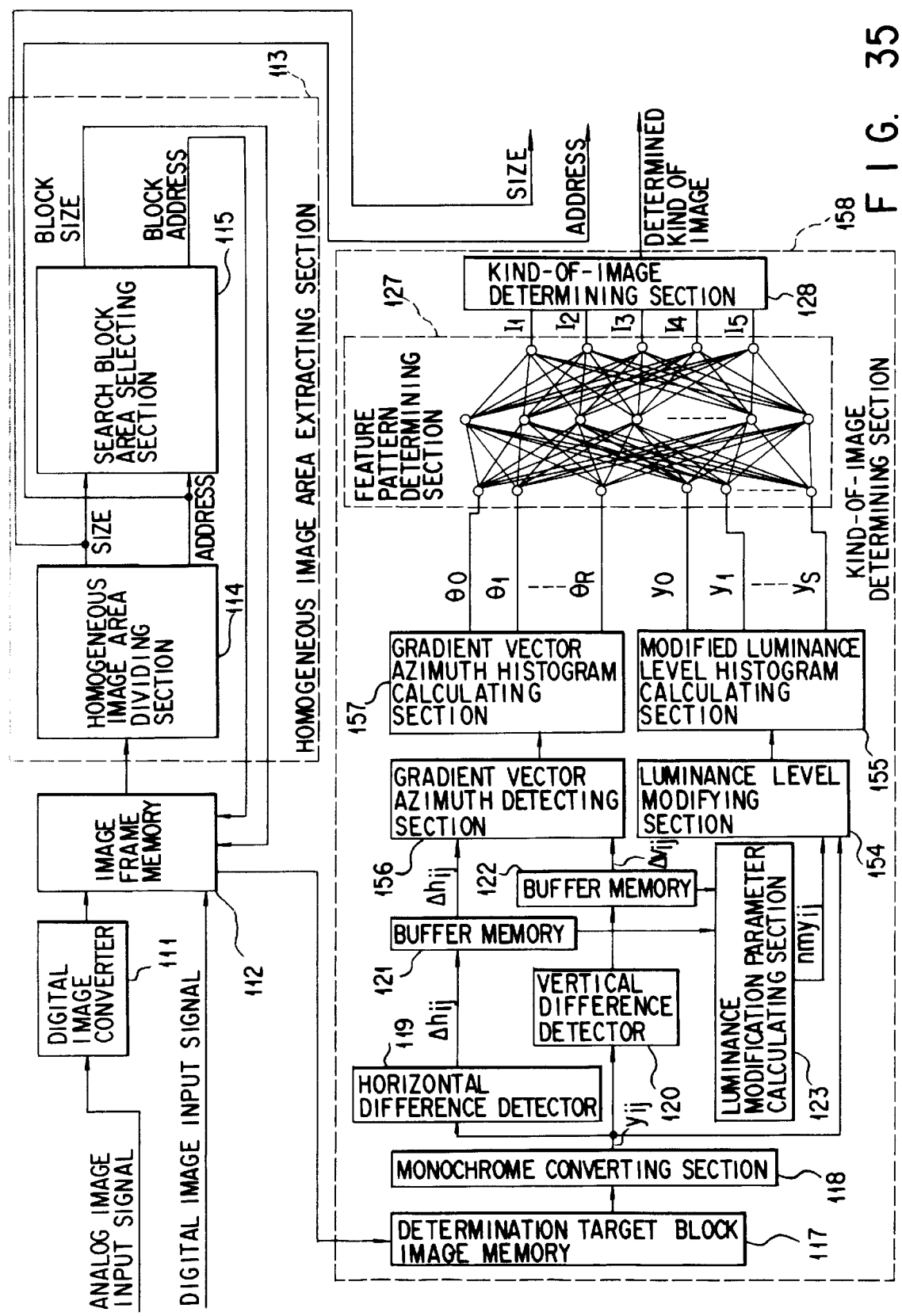
FIG. 35 is a block diagram showing the arrangement of an image processing apparatus according to the seventh embodiment of the present invention.
Figure 39:
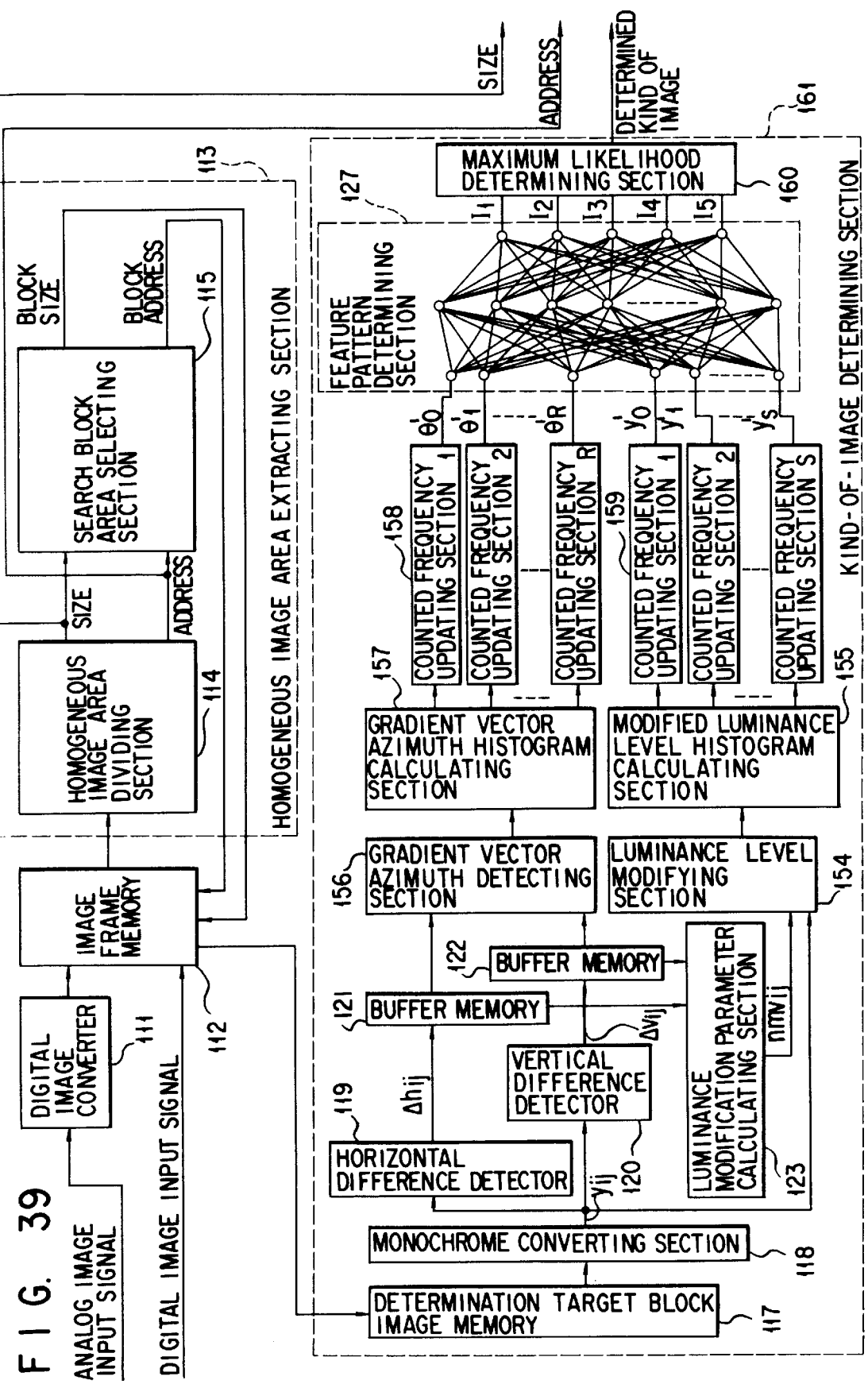
FIG. 39 is a block diagram showing an arrangement for determining the kinds of images on the basis of gradient vector azimuths and modified luminance levels by using a plurality of determination target areas in the seventh embodiment.

Different processing performed in the sections after the modified luminance histogram calculating section 155 and the gradient vector azimuth detecting section 156 having the arrangement shown in FIG. 35 will be described below. Assume that the processing contents are the same as those in the seventh embodiment, and the arrangement shown in FIG. 39 is employed. The same reference numerals in FIG. 39 denote the same parts as in FIG. 35, and a description thereof will be omitted.

As described in the eighth embodiment, the modified luminance histogram calculating section 155 and the gradient vector azimuth detecting section 156 extract feature vectors associated with an arbitrary determination target block in an arbitrary homogeneous image area. The frequencies of the resultant histograms are normalized and output. If determination target blocks, in an arbitrary homogeneous image area, selected by the search block selecting section 115 are numbered in the order of selection and identified, normalized feature vectors can be expressed as vector $\theta_L = [\theta_1, \theta_2, \theta_3, \ldots, \theta_R]$ vector $y_L = [y_1, y_2, y_3, \ldots, Y_S]$ for L=0, 1, . . . , L, where L is the total number of determination target blocks to be selected. "L" indicates the number of times of search in an arbitrary homogeneous image area in units of determination target blocks. The outputs (vector $\theta_L$ and vector $y_L$) from the modified luminance histogram calculating section 155 and the gradient vector azimuth detecting section 156 are input to R+S counted frequency updating sections R+S connected to each other and are repeatedly processed L times. with this processing, the outputs are updated to become the maximum values of the respective components.

That is, components $\theta_R$ and $y_S$ of these feature vectors are output as vector $\theta' = [\max(\theta_1), \max(\theta_2), \max(\theta_3), \ldots, \max(\theta_R)]_L$ vector $y' = [\max(y_1), \max(y_2), \max(y_3), \ldots, \max(y_S)]_L$ As described above, in order to obtain the histograms of updated feature vectors constituted by feature vector components indicating the maximum values of a plurality of determination target blocks in an arbitrary homogeneous image area, a series of operations performed between the search block selecting section 115 end the counted frequency updating section 158 must be repeated a predetermined number of times (L times).

The feature vectors θ' and y' output the number of times of search are input to the feature pattern determining section 127 constituted by the same hierarchical neural network as that of the feature pattern determining section 157 of the seventh embodiment. As a result, signals corresponding to the kinds of images to be identified, e.g., signals $I_1$ to $I_5$, are output. The output kind-of-image signals $I_1$ to $I_5$ are input to a maximum likelihood determining section 160. The maximum likelihood determining section 160 then outputs a kind-of-image signal exhibiting the maximum value as a signal indicating a maximum likelihood determined kind of image. In this embodiment, determination of the kind of image is not held.

The kind-of-image data output from the maximum likelihood determining section 160 and the address data and size data of the homogeneous image area, which data are similar to those in the seventh embodiment, are output, as final outputs, from the composite image area dividing apparatus of the eighth embodiment. If the arrangement and kind-of-image determination procedure of the eighth embodiment are realized, the patterns of a modified luminance histogram and a gradient vector azimuth histogram correlating with the kind of image can be formed by selectively extracting vector components which conspicuously indicate the features of the kind of image from vector components in a plurality of search areas in a homogeneous image area, thereby clarifying the differences between the feature patterns of all the kinds of images.

As described above, in the image processing apparatus of the eighth embodiment, since edge extraction/binarization is performed with respect to an input document image, end portions of image areas are not omitted. In addition, even a reverse monochrome document image can be efficiently divided into image areas.

Furthermore, in the image processing apparatus, a composite image having different kinds of images is accurately divided into homogeneous image areas, and a determination target area is set in a homogeneous image area to obtain the statistical amount of a distribution pattern indicated by three parameters, i.e., a horizontal difference value, a vertical difference value, and a modified luminance level. The distribution pattern is then recognized as a model to determine the kind of image. In this apparatus, therefore, a composite image can be accurately divided into image areas by processing with a relatively light load.

In classification and recognition of the above-mentioned distribution patterns, shapes distributed in a three-dimensional orthogonal space defined by the three parameters are converted into patterns and models by vector quantization on the basis of statistical data, in order to clarify the differences between the shapes. The shapes of the patterns as the models are recognized by the neural network, thereby realizing a proper clustering operation based on a statistical amount, similar to manual determination allowing high-precision determination of the kinds of images.

Area division of an image allows automation of data processing which is effective when performed in accordance with the kind of image, e.g., data compression, adaptive binarization, halftone processing, and various natural image processes (e.g., filtering) for realizing intentional image reproduction effects.

Furthermore, a composite image having different kinds of images, e.g., a typed character image, a handwritten character image, a photographic image, and a graphic pattern image, is accurately divided into homogeneous image areas. A determination target area is set in a homogeneous image area, and distribution patterns indicated by three parameters, i.e., a horizontal difference value, a vertical difference value, and a modified luminance level, are recognized as models, thereby realizing area division of a composite image to determine the kinds of images.

It is apparent that the present invention is not limited to the above-described embodiments, and various changes and modifications can be made within the spirit and scope of the invention. For example, if the kind of image of a given area is determined as a typed character, image data corresponding to the area is extracted. The extracted data is binarized and normalized, and character recognition processing is executed by performing character or word cutting. The typed character is then converted into code data (JIS code, shift JIS code, or ASCII code), this achieving the maximum character data compression effect.

As has been described in detail above, according to the present invention, there is provided an image processing apparatus, in which an input image having various kinds of images can be divided into areas for all kinds of images, and image data compression suitable for all the kinds of images can be performed, thereby improving the image quality, e.g., increasing the data compression ratio of an overall composite image.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An image processing apparatus comprising:

image input means for providing image data including various kinds of information;

binarization means for converting the image data provided by said image input means into binary image data;

reducing means for converting the binary image data provided by the binarization means into reduced image data used for area extraction;

constituent element area extracting means for extracting, from the reduced image data provided by the reducing means, an area in which image data having equivalent attributes are continuous;

kind-of-image determining means for determining a kind of an image included in the binary image data provided by said binarization means on the basis of an estimation criterion generated by use of statistical data that represents a feature amount of each of a plurality of kinds of images extracted beforehand, said kind-of-image determining means determining the kind of an image for each of said areas extracted by said constituent element area extracting means;

data compression scheme selecting means for selecting a suitable data compression scheme in accordance with the area extracted by said constituent element area extracting means and the kind of image determined by said kind-of-image determining means; and data compressing means for compressing image data from said image input means by the compression scheme selected by said data compression scheme selecting means;

wherein said kind-of-image determining means comprises:

a main component vector calculating section for statistically sampling the binary image data from said binarization means a plurality of times for every predetermined number of blocks from an area corresponding to the extracted area of image data output by the image input means, and converting binary image data expressed in units of blocks by normalized orthogonal vectors of pixels constituting a block into uncorrelated data, to produce main component vectors;

an inner product calculating section for calculating, in units of blocks, inner products of the main component vectors using partial image data of the block as a vector sampled from said image every block having a predetermined size; and a neural network section for performing preliminary learning on the basis of teacher data which is input in units of block data manually sampled, to set the number of the kinds of images to be determined from vectors which represent feature amounts defined as inner products of said main component vectors from said inner product calculating section.

2. An apparatus according to claim 1, wherein said kind-of-image determining means comprises:

another inner product calculating section for calculating inner products of the binary image data from said binarization means and said main component vectors in units of blocks; and another neural network section for determining a kind of image by using a network constructed by preliminary learning information, from outputs from said other inner product calculating section.

3. An image processing apparatus comprising:

image input means for providing image data having various kinds of information;

binarization means for converting image data provided by said image input means into binary image data;

reducing means for converting the binary image data provided by the binarization means into reduced image data used for area extraction;

constituent element area extracting means for extracting, from the reduced image data provided by the reducing means, an area in which image data having equivalent attributes are continuous;

kind-of-image determining means for determining a kind of an image included in the binary image data provided by said binarization means, on the basis of an estimation criterion generated by use of statistical data that represents a feature amount of each of a plurality of kinds of images extracted beforehand, said kind-of-image determining means determining the kind of an image for each of said areas extracted by said constituent element area extracting means;

data compression scheme selecting means for selecting a suitable data compression scheme in accordance with the area extracted by said constituent element area extracting means and the kind of image determined by said kind-of-image determining means; and data compressing means for compressing image data from said image input means by the compression scheme selected by said data compression scheme selecting means;

wherein said kind-of-image determining means extracts a feature reflecting a difference in image kind from statistical data and determines an estimation criterion used at the time of image kind determination, said kind-of-image determining means comprising:

a KL main component vector calculating section for statistically sampling the binary image data from said binarization means a plurality of times for every predetermined number of blocks, and converting binary image data expressed in units of one block by normalized orthogonal vectors of pixels constituting a block into uncorrelated data;

a base vector extracting section for calculating base vectors with respect to the binary image data converted into the uncorrelated data by said main component vector calculating section;

an inner product calculating section for calculating, in units of one block, inner products of the base vectors calculated by said base vector extracting section and the binary image data from said binarization means; and a neural network section for performing preliminary learning on the basis of teacher data input in units of one piece of block data manually sampled to set the number of the kinds of images to be determined from vectors representing feature amounts as inner products from said inner product calculating section.

4. An apparatus according to claim 3, wherein said kind-of-image determining means determines an actual image kind on the basis of the determined estimation criterion, said kind-of-image determining means further comprising:

a second inner product calculating section for calculating inner products of the binary image data from said binarization means and the base vectors obtained in advance in units of one block; and a second neural network section for determining a kind of image by using a network constructed by preliminary learning with respect to outputs from said inner product calculating section.

* * * * *